(12) United States Patent
Paulson et al.

(10) Patent No.: US 11,542,103 B1
(45) Date of Patent: Jan. 3, 2023

(54) FOOD-GRADE ROBOTIC GRIPPER FOR AUTOMATED PRODUCTION WORK CELL

(71) Applicant: RIOS Intelligent Machines, Inc., Palo Alto, CA (US)

(72) Inventors: Christopher A. Paulson, Belmont, CA (US); Nicholas L. Choi, South San Francisco, CA (US); Leo Keselman, Santa Clara, CA (US); Laura L. Sullivan, Redwood City, CA (US); Kent A. Evans, Cupertino, CA (US); Laura Stelzner, Redwood City, CA (US); Clinton J. Smith, San Francisco, CA (US)

(73) Assignee: RIOS Intelligent Machines, Inc., Menlo Park, CA (US)

( * ) Notice: Subject to any disclaimer, the term of this patent is extended or adjusted under 35 U.S.C. 154(b) by 14 days.

(21) Appl. No.: 17/389,088

(22) Filed: Jul. 29, 2021

(51) Int. Cl.
| | |
|---|---|
| *B25J 15/02* | (2006.01) |
| *B65G 47/90* | (2006.01) |
| *B25J 11/00* | (2006.01) |
| *B25J 13/08* | (2006.01) |

(52) U.S. Cl.
CPC ........... *B65G 47/90* (2013.01); *B25J 11/0045* (2013.01); *B25J 15/0253* (2013.01); *B25J 13/082* (2013.01); *B65G 2201/0202* (2013.01)

(58) Field of Classification Search
CPC .. B25J 15/0253; B25J 15/026; B25J 11/0045; B65G 2201/0202
USPC ...................................................... 294/119.1
See application file for complete search history.

(56) References Cited

U.S. PATENT DOCUMENTS

| | | | | |
|---|---|---|---|---|
| 4,132,318 A | * | 1/1979 | Wang ..................... | B25J 9/0015 414/21 |
| 4,611,846 A | * | 9/1986 | Feiber ................. | B25J 15/0253 414/737 |
| 4,680,523 A | * | 7/1987 | Goumas ................ | B25J 13/085 318/696 |
| 5,620,223 A | * | 4/1997 | Mills ..................... | B65G 47/90 294/93 |

(Continued)

FOREIGN PATENT DOCUMENTS

CH         674554      *   6/1990  .............. F16C 29/04

*Primary Examiner* — Ronald P Jarrett
(74) *Attorney, Agent, or Firm* — Bever, Hoffman & Harms, LLP

(57) ABSTRACT

An automated food production work cell includes a robotic system that utilizes a food-grade robotic gripper to transfer individual food items. The robotic gripper is constructed using food-grade materials and includes finger structures that are linearly movably connected by linear bearings to parallel guide rods and are independently driven by a non-contact actuating system to grasp targeted food items disposed on a first work surface, to hold the targeted food items while the robotic system moves the gripper to a second work surface, and to release the targeted food items onto the second work surface. Encoding and external sensing systems facilitate fully automated food transfer processes. Optional sensor arrays are disposed on tip portions of the finger structures to provide feedback data (e.g., grasping force/pressure). Two or more pairs of independently controlled finger structures are provided to facilitate the transfer of multiple food items during each transfer process.

16 Claims, 13 Drawing Sheets

(56) References Cited

U.S. PATENT DOCUMENTS

| | | | | |
|---|---|---|---|---|
| 5,829,811 | A * | 11/1998 | Skinner, II | B25J 15/0253 294/197 |
| 6,076,875 | A * | 6/2000 | Neff | B25J 15/0253 414/751.1 |
| 7,490,881 | B2 * | 2/2009 | Null | B25B 1/18 901/46 |
| 8,777,552 | B2 * | 7/2014 | Ward | B65G 57/00 414/736 |
| 2003/0189349 | A1 * | 10/2003 | Risle | B25J 15/0253 294/207 |
| 2011/0215797 | A1 * | 9/2011 | Steinich | G01B 7/003 324/207.25 |
| 2012/0134769 | A1 * | 5/2012 | Friedman | G01N 35/0099 414/800 |
| 2013/0134726 | A1 * | 5/2013 | Waizenegger | B25J 15/0028 294/119.1 |
| 2020/0354167 | A1 * | 11/2020 | Koenig | B65H 45/04 |
| 2021/0291384 | A1 * | 9/2021 | Chintalapalli Patta | B25J 15/0253 |
| 2022/0072730 | A1 * | 3/2022 | Bergmann | B25J 15/0253 |

* cited by examiner

FOOD-GRADE ROBOTIC GRIPPER FOR AUTOMATED PRODUCTION WORK CELL

FIELD OF THE INVENTION

This invention relates to automated production systems, and more particularly to food-grade robotic grippers for use in robotic-based automated food production work cells.

BACKGROUND OF THE INVENTION

Industrial robotic systems integrate mechanical, electrical/electronic and computer science technologies to provide software programmable, autonomously controlled mechanisms capable of performing a variety of mechanical operations with high endurance, speed, and precision. Typical applications of industrial robot systems include welding, painting, assembly, disassembly, pick-and-place, packaging and labeling, palletizing, product inspection and testing. Many industrial robotic systems include an arm-type robotic mechanism and a gripper-type end effector that are controlled by a coordinated series of software commands to perform repetitive tasks. For example, to perform repetitive pick-and-place operations, the arm-type robotic mechanism is controlled by first commands to move the end effector over a first X-Y-Z coordinate location, the gripper-type end effector is then controlled by second commands to grasp the target object, the robotic mechanism is then controlled to move the grasped object to a second location, and the end effector is then controlled to release the target object.

The return-on-investment (cost-effectiveness) of today's industrial robotic systems often depends on the sophistication (versatility) of the system's end effector. That is, return-on-investment is typically directly proportional to amount of time an industrial robotic system is operated (i.e., utilized to produce saleable products). This means that the high cost of purchasing and installing an industrial robotic system (i.e., several hundred thousand dollars or more) may be justified for producing a single product when there is an unending insatiable demand. However, in most cases industrial robotic systems must be utilized to perform two or more different production processes to maximize their productive operating time, and efficient reconfiguration of the system between the different production processes requires the use of an end effector that is sophisticated (versatile) enough to perform each of the production processes. By way of example, assume an industrial robotic system is tasked to perform two pick-and-place operations associated with the production of two product types having associated different product sizes. When the system utilizes a versatile gripper-type end effector that is capable of handle both product sizes, reconfiguration of the system between the two pick-and-place processes merely involves installing/executing the associated software program. Conversely, when the system utilizes less-sophisticated end effectors that can only handle associated product types/sizes, then significant down-time is required to swap (remove/replace) the end effectors and to recalibrate the system, thereby reducing return-on-investment. In this way, the cost-effectiveness of today's industrial robotic systems often depends on utilizing an end effector that is versatile enough to facilitate a wide range of production processes.

Food-grade robotic systems are specialized robotic systems that have been developed for the automated production of food items (e.g., processed food products such as meat-filled dumplings). To qualify for use in the automated production of food products intended for human consumption, robotic systems are required to meet U.S. Department of Agriculture or other government food-grade regulations. These government food-grade regulations, for example, restrict the materials utilized to construct the external mechanism structures (i.e., arm and end effector surfaces, joints and lubricants that may be exposed to food items during the automated production process) to certain approved food-grade materials that are compatible with approved sanitation procedures. Because the approved food-grade materials are often over specified (and significantly higher cost) for non-food-related robotic system applications, a majority of commercially available robotic systems are produced using nonconforming materials, and relatively few of the existing robotic systems are classified as food-grade robotic systems.

The utilization of food-grade robotic systems by food producing companies remains low primarily due to the current lack of sophisticated and durable food-grade end effectors. That is, although commercially available food-grade robotic mechanisms are available and fully capable of performing a wide range of automated food production processes, commercially available food-grade gripper-type end effectors are unable to perform a wide range of complex food transfer processes due to various operating limitations, which often makes the return-on-investment in food-grade robotic systems too low to justify. For example, soft gripper systems, such as those disclosed in U.S. Pat. No. 10,112,310, utilize finger-type soft actuators that extend from an end effector base and are caused to bend/straighten by pumping an inflation fluid into/from elastomeric bladders disposed in each actuator. A problem with robotic end effectors utilizing this soft gripper approach is that they are limited to a single food item size and lack dexterity, whereby food-grade robotic systems implementing these end effectors experience the significant down-time and corresponding reduced cost-effectiveness mentioned above. Because the lack of sophisticated food-grade end effectors limits commercially available food-grade robotic systems to relatively simple automated food production processes, food producers are forced to employ manual labor to perform repetitive complex food production processes, thereby both increasing production costs and the risk of contamination.

What is needed is a reliable and cost-effective robotic gripper that is adapted for use with existing robot mechanisms and meets all food-grade regulations. What is particularly needed is a high-speed food-grade robotic gripper capable of transferring a wide range of individual food item types/sizes between two work surfaces.

SUMMARY OF THE INVENTION

The present invention is directed to a novel food-grade robotic gripper and associated automated food production work cells (systems) in which the food-grade robotic gripper is configured for use as a high-speed gripper-type end effector for an arm-type or parallel-linkage-type robotic system to perform food transfer processes. Each transfer process generally involves utilizing the robotic system to position the food-grade robotic gripper over a first work surface, causing the food-grade robotic gripper to grasp one or more food items disposed on the first work surface, controlling the robotic system to move the food-grade robotic gripper from the first work surface to a location over a second work surface, and then causing the food-grade robotic gripper to release the grasped food item(s). As described below, the novel food-grade robotic gripper facilitates the performance of such food transfer processes for a wide range of target food item types/sizes while being adapted for use with existing robot mechanisms and constructed in a way that meets all food-grade regulations. Although described with specific reference to automated food production, the food-grade robotic grippers and associated work cells of the present invention may also be beneficially used in other contaminant-averse automated production processes, for instance, involving medical, pharmaceutical and military special handling products. In addition, although described with specific reference to transfer processes involving grasping, lifting, moving and releasing, the food-grade robotic grippers and work cells of the present invention may also be beneficially used to perform other processing operations.

In one embodiment the robotic gripper utilizes one or more pairs of finger structures that are linearly moveably connected to one or more guide rods by associated linear bearings and driven by a contact-free actuating system to grasp targeted food items during transfer processes. The guide rod(s) is/are connected between spaced-apart flanges of a rigid frame, which also includes a base portion having a connection feature that is operably configured for connection to an attachment member of a host work cell's robot mechanism. Each finger structure includes a base portion that is connected to at least one each guide rod by way of an associated linear bearings, and each finger structure has a tip portion that that extends from the base portion and is configured to contact a targeted food item during each transfer process. Each linear bearing is fixed connected to the base portion of a host finger structure and is linearly moveably mounted over an associated guide rod. In a presently preferred embodiment, the contact-free actuating system utilizes electromagnetic force to individually move/position the finger structures along the guide rod(s) and to apply a suitable contact force on a targeted food item during transfer processes. Note that, by utilizing a contact-free actuating system (and other contact-free systems) to drive and position the finger structures, the only physical moving contact between the finger structures and the rigid frame occurs at the linear bearing/guide rod connection, thereby facilitating the production of low-cost, high-speed food-grade robotic grippers because (a) the bracket and finger structures can be economically produced using food-grade materials, (b) suitable food-grade linear bearings are commercially available, and (c) commercially available contact-free actuator systems, such as tubular linear synchronous motor systems, qualify for use in automated food processing and facilitate very fast finger actuation. That is, by producing robotic gripper such that the frame, the finger structures and the first and second linear bearings are entirely constructed or coated by food-grade materials (e.g., stainless steel and/or food-grade acrylonitrile butadiene styrene (ABS) plastic), and by utilizing a contact-free actuator systems to perform grasping operations without requiring gearing, grease, or other physical contact between the finger structures and the rigid frame, the present invention provides a low-cost, food-grade robotic gripper that, when implemented by an appropriate automated production systems (e.g., the work cells described herein or other robotic systems operably configured for automated food production), facilitates high-speed food transfer processes for a wide range of food types.

In one embodiment, the linear bearings utilized to movably connect the finger structures to the frame are of a ball-bearing type that utilizes multiple stainless steel ball bearings and an optional food-grade lubricant to facilitate the required moveable connection to the guide rod(s). In a specific exemplary embodiment, each linear bearing includes a housing that is mounted and secured within an associated through-hole defined in the base portion of a host finger structure, and the guide rod passes through a cylindrical central passage defined in the housing. Stainless steel ball bearings are movably disposed within multiple races defined in the housing such that a portion (i.e., more than two) of the ball bearings disposed in partially open portions of each race extend from an inner cylindrical surface of the housing and contact corresponding portions of the guide rod. With this type of linear bearing, the ball bearings are constrained to move within the races in response to linear movement of the host finger structure along the guide rod, such that the inner cylindrical surface of the housing is always maintained at a fixed distance from the guide rod by the ball bearings in contact with the guide rod, thereby facilitating very precise positioning of the finger structures and minimizing friction. Utilizing food-grade linear bearings of this type provides the required food-grade qualifications while minimizing friction and maximizing finger position accuracy, thereby facilitating the use of relatively low energy non-contact actuating systems. In alternative embodiments, other food-grade linear bearing types, such as self-lubricating polymer-type linear bearings (i.e., self-lubricating blends of lubricants and Polytetrafluoroethylene or another low friction material having smooth surfaces that prevent material buildup and bacterial growth), may be utilized in place of food-grade ball-bearing-type linear bearings.

According to a presently preferred embodiment, the contact-free actuator system is implemented using tubular linear synchronous motors including independently controlled actuator (forcer) units respectively fixedly disposed on the finger structures, and a shared stator rod that extends in parallel with the guide rod(s) between the flanges of the gripper frame. In one embodiment, each actuator unit includes an actuator housing fixedly connected to a host finger structure and containing multiple ring-shaped or cylindrical solenoids that are respectively disposed around a cylindrical central opening and configured to generate electromagnetic fields in response to an applied driving current (e.g., an actuation control signal received from an external control circuit). In one embodiment the shared stator rod is fixedly connected to the frame and disposed in parallel with the guide rod between the first and second flanges and extends through the cylindrical central openings of each actuator unit such that a cylindrical air gap (separation) always exists between a cylindrical inner surface of the actuator housing and an outer surface of the stator rod. The shared stator rod further includes a series of permanent magnets that are disposed along the entire length of the stator rod and are operably configured to interact with the electromagnetic fields generated by the solenoids such that each actuator unit forms a corresponding separate tubular linear synchronous motor. With this arrangement, the non-contact actuating system drives each finger structure in a first direction along the guide rod by way of generating a first driving current in the solenoids of the corresponding actuator unit and drives the finger structure in an opposite (second) direction along the guide rod by way of generating an opposite driving current in the solenoids of the corresponding actuator unit. By utilizing this tubular linear synchronous motor arrangement to drive the finger structures, food-grade robotic grippers produced in accordance with the present invention achieve high-speed and high-acceleration/deceleration actuator operations and extremely precise pressure control while meeting required food-grade qualifications (e.g., by avoiding food contaminant particles that are typically generated by contact-type actuating mechanisms). In other embodiments, other contact-free actuator arrangements may also be utilized, such as the planar magnetic motor arrangements utilized in roller coasters and high-speed trains, or arrangements involving electromagnetic coupling between an actuator disposed on each finger structure and a shared stator rod.

In some embodiments the food-grade robotic gripper further includes a non-contact (e.g., electromagnetic or optically scaled) encoding system configured to provide current position data that independently detects movement of each finger structure along the guide rods(s) to facilitate precise linear positioning during transfer processes. In a presently preferred embodiment, the encoding system includes an elongated encoder scale that is fixedly connected to the frame and separate encoder units respectively mounted on each finger structure. The encoder scale includes an elongated base that extends in parallel with the guide rod(s) and includes permanent magnets (or other position data) arranged in series between the flanges. In one embodiment each encoder unit includes an encoder housing, a magnetic sensor and an optional encoder circuit. The encoder housing is fixedly connected to a host finger structure and positioned at an air gap distance from the encoder scale such that the sensor is maintained at a fixed distance from the permanent magnets when the host finger structure is moved along the guide rod(s). The magnetic sensor is electromagnetically coupled to the encoder scale (i.e., to the permanent magnets or other position data) and is operably configured (e.g., by way of the optional encoder circuit) to generate a current position signal indicating linear movement of the host finger structure on the guide rod(s). By incorporating this non-contact encoding system, the food-grade robotic grippers of the present invention facilitate highly precise positioning of the finger structures during transfer processes (e.g., when combined with food item location information provided by an associated sensing/vision system, discussed below) without violating food-grade regulations, thereby facilitating reliable high-speed transfer processes at a low cost. In other embodiments, other encoding system arrangements involving optical or capacitive linear encoders may also be utilized.

In a presently preferred embodiment the frame includes at least two parallel guide rods and each finger structure includes two linear bearings that are movably connected to corresponding guide rods. This two-bearing/parallel-guide-rods arrangement stabilizes linear movement of the finger structures and enhancing positioning precision and prevents undesirable misalignment or damage to the contact-free actuator system that might occur due to rotation of the finger structures around a single guide in single bearing arrangements. In other embodiments a single bearing arrangement may be utilized in conjunction with another mechanism configured to prevent rotation of the finger structure.

In an exemplary practical embodiment an enhanced food-grade robotic gripper includes two or more pairs of finger structures that are arranged in parallel to facilitate the simultaneous transfer of multiple (two or more) food items during each transfer process, thereby reducing total operating costs to a work cell implementing the robotic gripper in the manner described below. Providing two or more pairs of finger structures on each robotic gripper also facilitates grasping (picking up) two or more food items disposed in a random pattern on a first working surface and adjusting the positions of the finger structures such that the two or more food items are rearranged into a desired (e.g., aligned) pattern when subsequently simultaneously released onto a second working surface, thereby reducing total operating costs to the work cell implementing the robotic gripper.

In some embodiments each pair of finger structures includes opposing sensor arrays that are cooperatively configured to measure actual gripping forces applied by the associated pair of finger structures on a grasped targeted food item for comparison with predetermined optimal gripping force values, thereby enabling fine grasping force adjustments to enhance operational reliability of the robotic gripper. In some embodiments the sensor arrays include additional sensor types (e.g., vibration, proximity and/or temperature sensors) that facilitate additional functionality (e.g., detecting food item slippage) to further enhance operational reliability of the robotic gripper.

In another embodiment an automated food production work cell is configured to perform the food transfer processes described above by way of coordinating operations of the robotic system and the contact-free actuator system. In one embodiment, the robotic system's control circuitry is configured to position the robotic gripper over a first work surface at the beginning of each transfer process, to lift (remove) the robotic gripper from the first work surface after robotic gripper performs a corresponding grasping operation that secures a targeted food item to the gripper, and to reposition the robotic gripper over a second work surface such that, when the targeted food item is subsequently released by the robotic gripper, the transferred food item is properly positioned on the second work surface for subsequent processing. The gripper control circuit of the contact-free actuator system is coordinated with the robot control circuitry to perform a grasping operation at the beginning of each transfer process by independently driving the actuator units disposed on the two finger structures such that the associated finger structures collectively apply a sufficient grasping force on the targeted food item to secure (hold) the targeted food item therebetween while the robot mechanism subsequently moves the food-grade robotic gripper from the first work surface to the second work surface, and to then release the grasping force (i.e., by driving the actuator units such that the finger structures move away from each other), whereby the targeted food item remains on the second work surface when the robot mechanism subsequently returns food-grade robotic gripper to the first work surface to perform a next sequential transfer process. This arrangement reduces total operating costs by reducing wear-and-tear damage (i.e., deterioration due to normal operation) to the robot mechanism. That is, by controlling the robot mechanism to position the robotic gripper at the same location at the beginning of each transfer process, and by controlling the finger structures to grasp food items located at various positions between the flanges, this arrangement reduces the duration and/or scope of operations performed by the robot mechanism, thereby reducing wear-and-tear damage. Because robot mechanisms are typically substantially more expensive than the food-grade robotic grippers produced in accordance with the present invention (i.e., 10× or more), total operating costs are reduced by effectively transferring significant positioning operations (and the resulting wear-and-tear damage) from the robot mechanisms to the robotic gripper.

In accordance with another practical embodiment, the work cell also utilizes a conveyor (conveyor belt mechanism) and a sensing system to facilitate automated processing of incoming food items disposed in a random arrangement. An upward-facing surface of the conveyor serves as the first work surface on which the incoming food items are conveyed in a first orthogonal (e.g., X-axis) direction from an upstream source (e.g., a food item assembly mechanism or other source that is external to the work cell), and the robotic gripper is oriented such that the guide rods are aligned in a second orthogonal (e.g., Y-axis) direction (i.e., perpendicular to the first orthogonal direction). The sensing system is configured to detect and identify targeted food items disposed upstream from a designated capture location and to generate trajectory data for each targeted food item (i.e., position data indicating the X-axis position of a given targeted food item on the conveyor surface and timing data indicating when the targeted food item will arrive at the designated downstream capture location). In a presently preferred embodiment, the sensing system is vision-based system implemented by a camera and an associated image processing circuit, where the camera is configured to capture current image data of the first work surface as the conveyor moves the targeted food items through an imaged targeted food item identification region, and the image processing circuit is configured to generate trajectory data for each targeted food item identified from the current image data. In this embodiment the gripper control circuit is further configured to control the finger structures to corresponding linear locations along the guide rod(s) in accordance with the trajectory data (e.g., using position data provided by the contact-free encoding system described above) such that the finger structures are positioned on opposite sides of a selected targeted food item just before the conveyor moves the targeted food item into its corresponding capture location, and such that the finger structures are driven to apply a suitable grasping force applied to a targeted food item (e.g., as measured by sensor arrays disposed on the opposing finger structures in the manner mentioned above) when the targeted food item moves into the capture location. This arrangement further enhances total operating cost reduction by facilitating the efficient grasping and transfer of targeted food items in a manner that reduces wear-and-tear damage to the robot mechanism.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in robotic grippers and work cells utilized to automated food production. The following description is presented to enable one of ordinary skill in the art to make and use the invention as provided in the context of a particular application and its requirements. As used herein, directional terms such as "upper", "lower", "upward facing", "upstream" and "downstream" are intended to provide relative positions for purposes of description and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
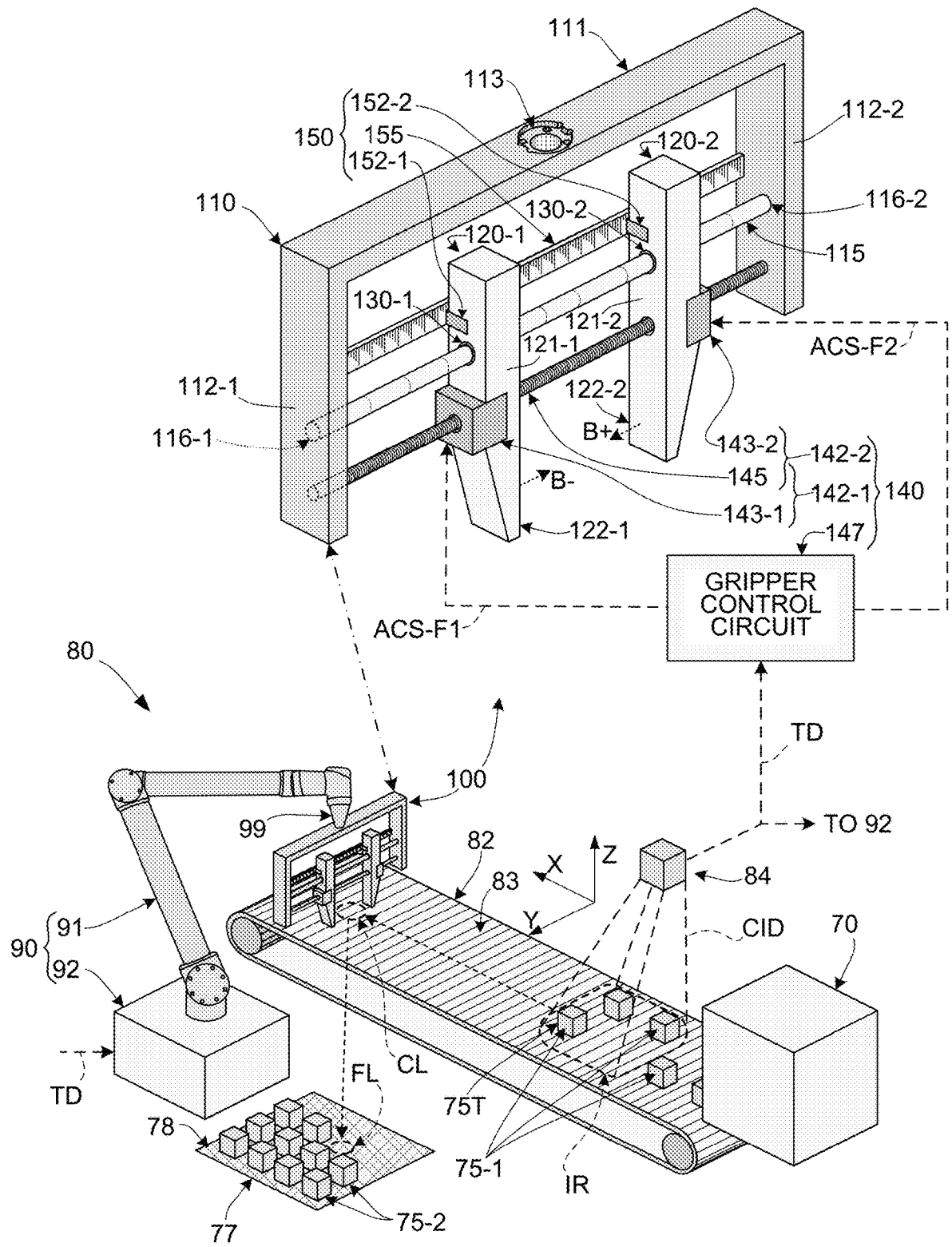
FIG. 1 depicts an automated food production work cell utilizing a food-grade robotic gripper according to a simplified exemplary embodiment of the present invention.

FIG. 1 depicts a simplified automated food production work cell (system) 80 including at least one robot (robotic system) 90 that manipulates a food-grade robotic gripper 100 as described below to transfer incoming food items 75-1 from a first work surface 83 to a second work surface 77. In practical applications work cell 80 is implemented within a larger food production process to receive partially or fully processed food items from an upstream source, and to transfer the food items to a downstream destination in a manner that facilitates either further processing or final packaging. In an exemplary larger food production process context, first work surface 83 represents an upstream surface on which food items are received by work cell 80 from an upstream source 70 (e.g., a food item assembly mechanism), and second work surface 78 represents a downstream surface on which transferred food items 75-2 are arranged for subsequent processing or final packaging. In presently preferred embodiments, first working surface 83 is a moving surface that conveys or otherwise moves incoming food items 75-1 toward a designated capture location CL. In the depicted embodiments, first working surface 83 is implemented by a conveyor (conveyor belt mechanism) 82, and more specifically by an upward-facing portion of a conveyor belt that is trained over horizontally oriented drive rollers and driven by a suitable drive mechanism such that incoming target items 75-1 are conveyed in an X-axis direction (from right to left in FIG. 1) on first working surface 83. In other embodiments first working surface 83 may be implemented by another type of moving surface or by a stationary surface. Second work surface 78 is provided by the upper surface of a stationary or moving downstream platform 77, such as a processing tray, a downstream conveyor belt or a final packaging container.

Referring to the lower left portion of FIG. 1, robotic system 90 includes an arm-type robot mechanism 91 and a corresponding control circuit 92. Robot mechanism 91 is disposed adjacent to conveyor 82 and is operably configured to move robotic gripper 100 between working surfaces 83 and 77 to facilitate the transfer processes described below. Control circuit 92 is operably configured to transmit control signals to the various actuators/motors of robot mechanism 91 such that robot mechanism 91 manipulates (moves) robotic gripper 100. In one embodiment robotic system 90 is a commercially available food-grade robot system that is configured (programmed) using known techniques to perform food transfer processes. During each transfer process, robotic gripper 100 is operably positioned by robot mechanism 91 over first work surface 83, then robotic gripper 100 is controlled as described below to grasp (capture) one or more targeted food items disposed on first work surface 83 and maintains its grasp on the food item(s) while robot mechanism 91 moves robotic gripper 100 over second work surface 77, and then robotic gripper 100 is controlled as described below to release the food item(s) onto second work surface 77. For descriptive purposes, food items on first work surface 83 (i.e., before being transferred) are referred to as incoming food items 75-1, food items on second work surface 78 (i.e., after being transferred) are referred to as transferred (outgoing) food items 75-2, and a food item selected for transfer from work surface 83 to work surface 78 is referred to as a targeted food item 75T. In some embodiments one or more of conveyor belt 82 and processing tray 77 form part of work cell 80.

Figure 2:
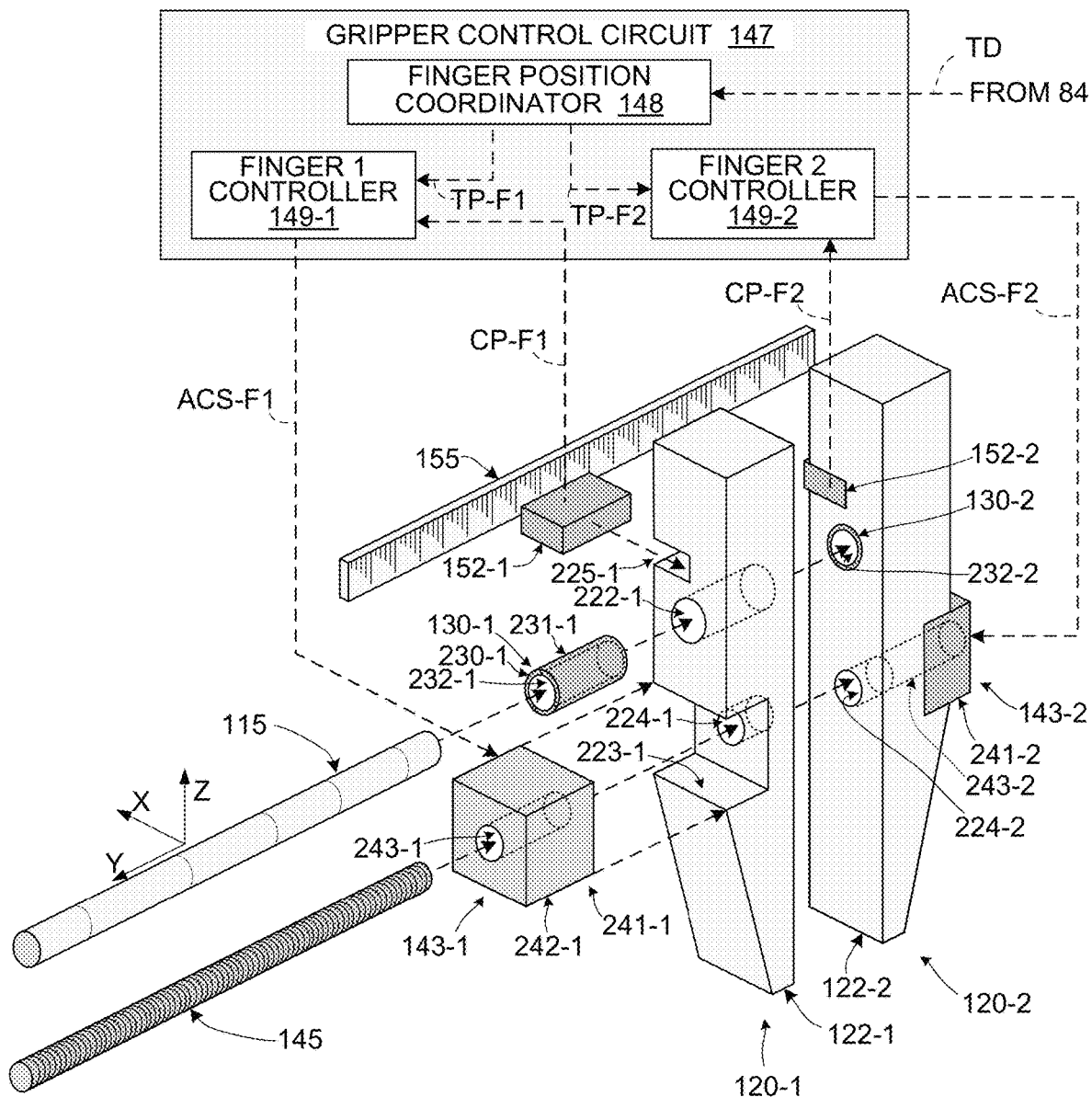
FIG. 2 is an exploded perspective showing the robotic gripper of FIG. 1 in additional detail.

Referring to an upper portion of FIG. 1 and to FIG. 2, robotic gripper 100 generally includes a frame 110, an associated pair of finger structures 120-1 and 120-2 that are respectively connected to frame 110 by linear bearings 130-1 and 130-2, a contact-free actuator system 140 and an optional encoding system 150. According to an aspect of the invention, frame 110 and fingers 120-1 and 120-2 consist essentially of food-grade materials (e.g., stainless steel and food-grade ABS plastic), linear bearings 130-1 and 130-2 are implemented using commercially available food-grade bearings, and all components and wires associated with non-contact actuating system 140 and optional non-contact encoding system 150 are constructed or operably coated by food-grade materials to facilitate the use of robotic gripper 100 in automated food production processes performed by work cell 80.

Referring to FIG. 1, frame 110 generally includes an elongated base portion 111, spaced-apart flanges 112-1 and 112-2 that are integrally or otherwise fixedly connected to opposite ends of base portion 111, and a guide rod 115 fixedly connected to the flanges 112-1 and 112-2. The base portion 111 includes a robot connection feature 113 that is operably configured for connection to an attachment member 99 of the robot mechanism 91. Guide rod 115 includes a first end portion 116-1 fixedly connected to flange 112-1 and an opposing a second end portion 116-2 fixedly connected to flange 112-2. Frame 110 is configured such that a length of guide rod 115 (i.e., measured in the Y-axis direction) has a practical value (e.g., equal to the width of the conveyor belt forming first working surface 83). Note that a stator rod 145 and an optional encoder scale 155 are connected in parallel between flanges 112-1 and 112-2; although these structures are described below as being associated with contact-free actuator system 140 and optional encoding system 150, respectively, these structures may be also considered part of frame 110 by way of their connection to flanges 112-1 and 112-2.

As indicated in FIGS. 1 and 2, finger structures 120-1 and 120-2 respectively include base portions 121-1 and 121-2 that are independently movably connected to guide rod 115 by way of linear bearings 130-1 and 130-2, respectively, and have tip portions 122-1 and 122-2 that are configured to contact opposite sides of targeted food items when robotic gripper 100 is controlled to perform a grasping operation (as described below). Finger structures 120-1 and 120-2 are constrained to move over a linear range established by a flange at one end and the other finger structure at the other end. That is, the range of linear movement of finger structure 120-1 on guide rod 115 is constrained at one end by flange 112-1 and at the other end by finger structure 120-2, and finger structure 120-2 is similarly constrained to move between finger structure 120-1 and flange 112-2. As described in further detail below, the independent movement of finger structures 120-1 and 120-2 over these ranges facilitates grasping targeted food items having a wide range of Y-axis positions on first working surface 83.

Figure 3:
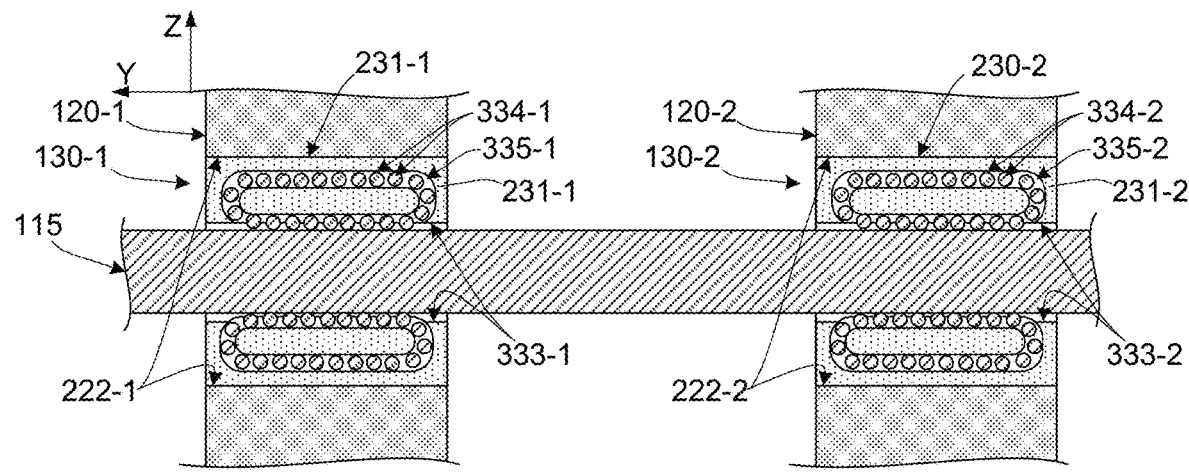
FIG. 3 is a simplified partial cross-sectional view showing an exemplary food-grade linear bearing utilized by the robotic gripper of FIG. 1.

Linear bearings 130-1 and 130-2 of a ball-bearing type are depicted in FIGS. 2 and 3 for reference. As indicated in FIGS. 2 and 3, linear bearings 130-1 and 130-2 include housings 231-1 and 231-2 that are respectively mounted in through-holes 222-1 and 222-2 that are defined in (e.g., drilled into or formed by molding) base portions 121-1 and 121-2 of finger structures 120-1 and 120-2, respectively, and have cylindrical central openings 232-1 and 232-2 that are respectively mounted over guide rod 115. FIG. 3 is a cross-sectional side view depicting linear bearings 130-1 and 130-2 after being fixedly connected to finger structures 120-1 and 120-2 by way of an adhesive or other fastening mechanism, and after being operably mounted onto guide rod 115. Each linear bearing 130-1 and 130-2 includes stainless steel ball bearings 334-1 and 334-2 that are movably disposed within associated races 335-1 and 335-2 defined (i.e., formed or otherwise provided) in housings 231-1 and 231-2. Note that inner cylindrical surfaces 333-1 and 333-2, which face toward and surround corresponding sections of guide rod 115, are maintained a small distance from guide rod 115 by a portion of ball bearings 334-1 and 334-2 that contact the outer surface of guide rod 115 (i.e., in the example shown in FIG. 3, nine ball bearings 334-1 in each race 335-1 extend from inner cylindrical surface 333-1 through slots/openings formed in race 335-1 and contact corresponding respective portions of guide rod 115, whereby finger structure 120-1 is operably connected to guide rod 115 such that finger structure 120-1 is constrained to move linearly along guide rod 115 (i.e., in the Y-axis and −Y-axis direction depicted in the figure). Linear bearing 130-2 is configured and operably connects finger structure 120-2 to a corresponding portion of guide rail 115 in the same manner as that described above with reference to bearing 130-1. Linear bearings 130-1 and 130-2 are provided as simplified descriptions of an exemplary embodiment, and the details indicated in FIG. 3 are not intended to be limiting. Food-grade linear bearings of the type depicted in FIG. 3 are commercially available, but implementation of such linear bearings in the specific context provided by the present invention (e.g., to facilitate grasping food items during transfer processes as described below) is unknown in the art. In an alternative embodiment, self-lubricating polymer-type linear bearings, such as Iglide® A181 sleeve bearings provided by Igus® Inc. of East Providence, R.I., USA, are used in place of ball-bearing type linear bearings 130-1 and 130-2.

Referring to FIG. 1, robotic gripper 100 utilizes a contact-free actuator system 140 to independently drive (i.e., apply separate motive forces to) finger structures 120-1 and 120-2 such that tip portions 122-1 and 122-2 apply a suitable grasping force on a targeted food item during each transfer process (as explained below). As used herein, the phrase "contact-free actuator system" is defined as a system that is capable of driving finger structures 120-1 and 120-2 using only non-contact forces (i.e., a force that does not involve physical contact between a driving structure and the finger structures), and the phrase "suitable grasping force" is intended to mean opposing contact forces applied on a targeted food item 75T that are sufficient to facilitate lifting the targeted food item from first work surface 83 during a transfer process. In the disclosed embodiments, contact-free actuator system 140 utilizes electromagnetic-type contact-free motors to drive finger structures 120-1 and 120-2, in part because such motors provide excellent control bandwidth (e.g., with a force resolution of 0.001 Newtons), thereby facilitating the generation of optimal grasping forces (i.e., opposing contact forces at a level that facilitates lifting/grasping control while preventing deformation/damage of the grasped target food item). That is, although some motor/actuator arrangements may produce suitable grasping forces, the use of electromagnetic-type contact-free motors greatly enhances the production of optimal grasping forces.

Referring again to FIG. 1, contact-free actuator system 140 generally includes a first tubular linear synchronous motor 142-1 formed by electromagnetic coupling between a first actuator (forcer) unit 143-1 and a corresponding first portion of a shared stator rod 145, a second tubular linear synchronous motor 142-2 including a second actuator unit 143-2 that is electromagnetically coupled to a corresponding second portion of shared stator rod 145, and an associated gripper control circuit 147. Elongated stator rod 145 is fixedly connected to frame 110 (i.e., opposing ends of stator rod 145 are respectively connected to flanges 112-1 and 112-2) and extends parallel to guide rod 115. Actuator units 143-1 and 143-2 are respectively fixedly connected finger structures 120-1 and 120-2 and positioned such that, when finger structures 120-1 and 120-2 are movably connected to guide rod 115 by linear bearings 130-1 and 130-2, respectively, actuator units 143-1 and 143-2 are electromagnetically coupled to stator rod 145. Gripper control circuit 147 is configured to independently drive (i.e., apply motive forces to) finger structures 120-1 and 120-2 by way of generating and transmitting separate actuation control signals ACS-F1 and ACS-F2 to actuator units 143-1 and 143-2, respectively. For example, during an exemplary grasping operation, gripper control circuit 147 generates actuation control signals ACS-F1 and ACS-F2 such that actuator unit 143-1 exerts a biasing force B– on finger structure 120-1 and such that actuator unit 143-2 exerts an opposite biasing force B+ on finger structure 120-2, thereby driving finger structures 120-1 and 120-2 toward each other.

Referring to FIG. 2, each actuator unit 143-1 and 143-2 includes a housing that facilitates both fixed connection to finger structures 120-1 and 120-2 and electromagnetic coupling to stator rod 145. Specifically, actuator unit 143-1 has a first actuator housing 241-1 having an outer surface 242-1 configured for insertion within a corresponding mounting feature 223-1 formed in finger structure 120-1 and is fixedly connected to finger structure 120-1, for example, by way of a suitable adhesive or fastener. Housing 241-1 also includes a cylindrical central opening 243-1 that aligns with a through hole 224-1 formed in finger structure 120-1 to facilitate stator rod 145 as described below. Similarly, actuator unit 143-2 includes a second actuator housing 241-2 fixedly secured in a corresponding mounting feature formed in finger structure 120-2 and includes a cylindrical central opening 243-2 that aligns with a through hole 224-2 formed in finger structure 120-2.

Figure 4A:
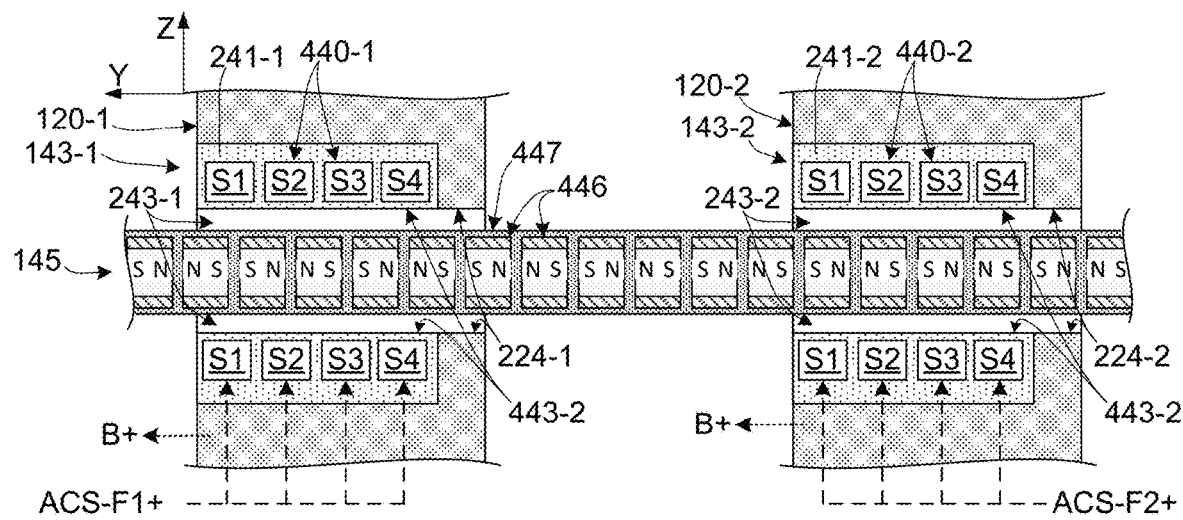
FIGS. 4A, 4B and 4C are simplified partial cross-sectional views depicting the operation of an exemplary non-contact actuator utilized by the robotic gripper of FIG. 1.

FIG. 4A is a partial cross-sectional side view showing actuator units 143-1 and 143-2 and stator rod 145 in additional detail. Stator rod 145 includes multiple permanent magnets 446 that are aligned in the Y-axis direction and oriented in an alternating and opposite (NNSS) configuration. In one embodiment permanent magnets 446 are enclosed within a food-grade material layer (e.g., stainless steel 316) that forms an outer cylindrical surface 447 of stator rod 145. Note that cylindrical central openings 243-1 and 243-2 and corresponding through holes 224-1 and 224-2 have an inside diameter that is larger than outer cylindrical surface 447, and stator rod 145 positioned relative to housings 241-1 and 241-2 such that outer cylindrical surface 447 of stator rod 145 is spaced from cylindrical inner surfaces 443-1 and 443-2 of actuator housings 241-1 and 241-2 (i.e., an air gap separation distance is maintained between outer cylindrical surface 447 for all Y-axis positions of finger structures 120-1 and 120-2).

Figure 4B:
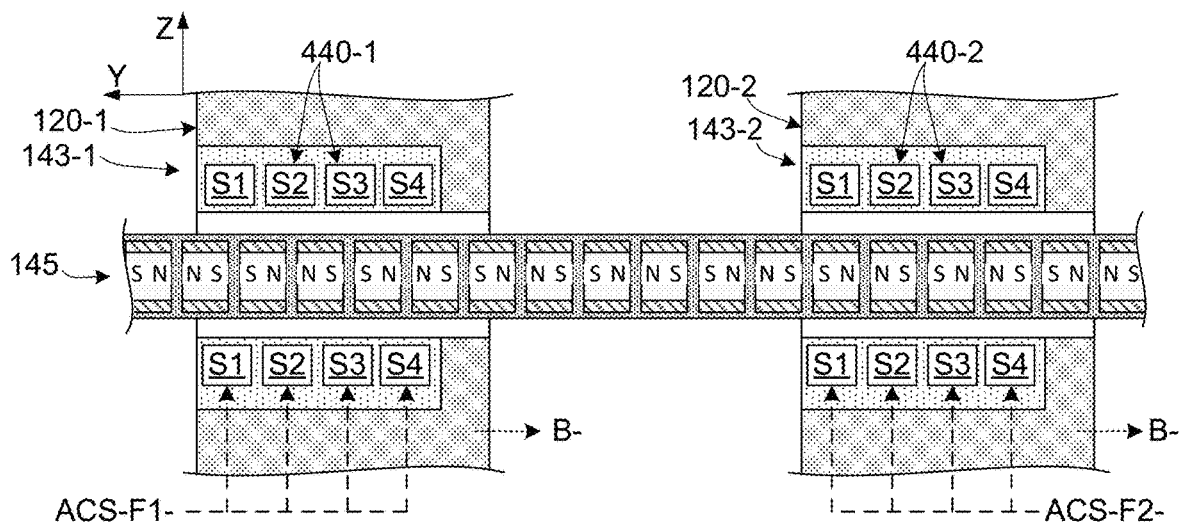
Figure 4C:
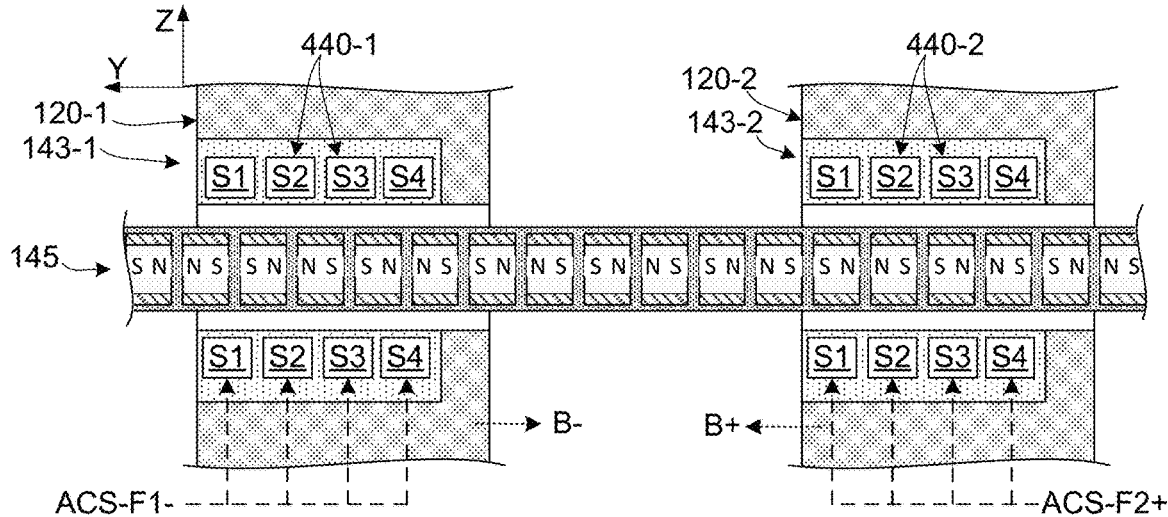

In one embodiment actuator units 143-1 and 143-2 respectively include one or more cylindrical or ring-shaped transducer devices 440-1 and 440-2 that are disposed within housings 241-1 and 241-2 and independently operably coupled to permanent magnets 446 such that actuator units 143-1 and 143-2 apply independent biasing forces on finger structures 120-1 and 120-2 in response to corresponding actuation signals ACS-F1 and ACS-F2. In one embodiment, each transducer device 440-1 and 440-2 includes four solenoids S1 to S4 generate biasing forces in either the +Y-axis or –Y-axis direction in response to associated applied actuation control signals. As depicted in FIG. 4A, when gripper control circuit 147 transmits a first pair of actuation control signals ACS-F1+ and ACS-F2+ to the solenoids in transducer devices 440-1 and 440-2, actuator units 143-1 and 143-2 respectively exert first biasing B+ forces on finger structures 120-1 and 120-2, thereby driving finger structures 120-1 and 120-2 in a +Y-axis (first linear) direction. Conversely, as depicted in FIG. 4B, when gripper control circuit 147 transmits a second pair of actuation control signals ACS-F1– and ACS-F2– to transducer devices 440-1 and 440-2, actuator units 143-1 and 143-2 apply biasing forces B-on finger structures 120-1 and 120-2, thereby driving finger structures 120-1 and 120-2 in the –Y-axis (second) linear direction (i.e., opposite to the first linear direction). Finally, as indicated in FIG. 4C, when gripper control circuit 147 transmits a first actuation control signal ACS-F1—to transducer device 440-1 and a second actuation control signal ACS-F1+ to transducer device 440-2, actuator units 143-1 and 143-2 apply opposing biasing forces (i.e., B– and B+, respectively) on finger structures 120-1 and 120-2, thereby driving finger structures 120-1 and 120-2 in opposite (i.e., –Y-axis and +Y-axis) directions, respectively, thereby enabling robotic grippers of the present invention to move toward each other in order to grasp food items during performance the transfer processes described below. At the end of each transfer process, opposite actuation control signals cause the transducer devices to apply opposite opposing biasing forces that move the finger structures away from each other to release (let go) the grasped food item.

Referring again to FIG. 1, some embodiments incoming food items 75-1 are received in a random arrangement on conveyor belt 82 from an upstream food processing stage 70 (e.g., a food item assembly mechanism) and work cell 80 is configured such that transferred (outgoing) food items 75-2 are arranged in an ordered pattern (e.g., in aligned rows and columns) on second work surface 78. That is, incoming food items 75-1 received from upstream food processing stage 70 are conveyed (moved) by conveyor belt 82 in a random two-dimensional pattern (such that each incoming food item 75-1 has an associated random X-axis and Y-axis location on first work surface 83) in the X-axis direction toward robotic gripper 100. In one embodiment work cell 80 includes a sensing system 84 (e.g., a vision-based sensing system) that is operably positioned to identify incoming food items 75-1 as they pass through an upstream target identification region IR, and to generate trajectory data TD that is operably configured for use by gripper control circuit 147 to facilitate capturing (grasping) targeted food items when they reach a downstream capture location CL. In one embodiment trajectory data TD provides a time-based location (e.g., X-axis and Y-axis coordinates) of each targeted food item 75T in the stream of incoming food items 75-1 on conveyor belt 82. In some embodiments trajectory data TD is also utilized by robotic system 90 to operably position robotic gripper 100 to facilitate sequentially performed grasping operations as targeted food items arrive at their calculated downstream capture location. In other embodiments trajectory data TD is transmitted from sensing system 84 only to robotic system 90, and robotic system 90 generates control signals that are provided to robotic gripper 100. By utilizing sensing system 84 to coordinate the transfer processes performed by robotic system 90 and robotic gripper 100 (as described below), work cell 90 is operably configured to rearrange food items receiving in a randomly positioned arrangement into a desired ordered pattern for further processing or final packaging. In a practical embodiment, sensing system 84 generally includes a camera and an associated image processing module, where the camera (e.g., a digital video camera or laser line scanner) is operably mounted over working surface 83 and otherwise configured to capture current image data from region IR, and the image processing module is configured (e.g., using hardware and/or software techniques) to identify targeted food items by comparing the captured current image data with stored image data that operably visually describes the food items being processed by work cell 80 using known image processing techniques that include projection, background subtraction, object segmentation, identification, and Kalman filtering.

Figure 5A:
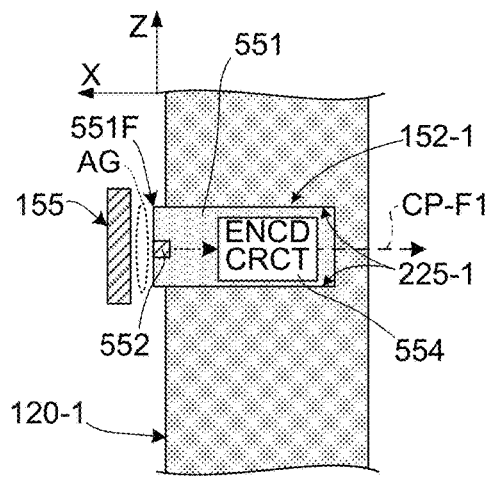
FIGS. 5A and 5B are a simplified cross-sectional side view and partial front view, respectively, showing an exemplary non-contact encoding system utilized by the robotic gripper of FIG. 1.
Figure 5B:
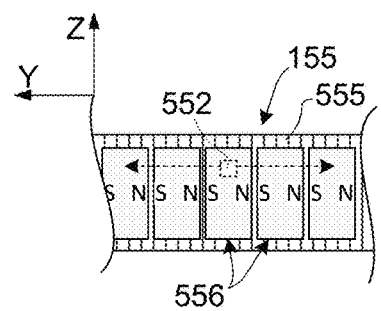

Referring again to FIG. 1, an optional contact-free encoding system 150 is utilized to detect the independent movement (i.e., the associated Y-axis positions) of second finger structures 120-1 and 120-2 on guide rod 115. In one embodiment contact-free encoding system 150 includes a first encoder unit 152-1 that is fixedly disposed on first finger structure 120-1, a second encoder unit 152-2 that is fixedly disposed on second finger structure 120-2, and a shared encoder scale 155 that is fixedly connected to frame 110 and extends parallel to guide rod 115. Referring to FIG. 2, first encoder unit 152-1 is configured to generate first current position data CP-F1 indicating a current linear (i.e., Y-axis) position of first finger structure 120-1 on guide rod 115, second encoder unit 152-2 is configured to generate second current position data CP-F2 indicating a current linear position of second finger structure 120-2 on guide rod 115. As also indicated in FIG. 2, each encoder unit 152-1 and 152-2 includes a housing that facilitates both fixed connection to finger structures 120-1 and 120-2 and a continuous electromagnetic coupling to encoder scale 155. Specifically, encoder unit 152-1 is configured for insertion within a corresponding mounting slot 225-1 formed in finger structure 120-1 and is fixedly connected by way of a suitable adhesive or fastener. Similarly, encoder unit 152-2 is fixedly secured in a corresponding mounting feature formed in finger structure 120-2. As indicated in FIGS. 5A and 5B, encoder scale 155 includes an elongated base tape 555 having permanent magnets 556 disposed thereon and aligned in series in the Y-axis direction. As shown in FIG. 5A, encoder unit 152-1 includes an encoder housing 551 fixedly connected to first finger structure 120-1 such that an air gap separation distance AG is maintained between a front surface 551F and encoder scale 155 when finger structure 120-1 is linearly moved along the guide rod in the Y-axis direction. Encoder unit 152-1 also includes a sensor 552 that is electromagnetically coupled to position data provided on encoder scale 155 (e.g., permanent magnets 556, shown in FIG. 5B) such that movement of first finger structure 120-1 in the Y-axis direction is detected by sensor 552 and converted (e.g., by an encoder circuit 554 also mounted in encoder housing 551) into current position data (signal) CP-F1 that indicates a current linear (Y-axis) position of finger structure 120-1 on the guide rod.

Referring again to FIG. 2, in one embodiment gripper control circuit 147 is further configured to utilize trajectory data TD received from sensing system 84 and current position data CP-F1 and CP-F2 received from encoder units 152-1 and 152-2 to drive finger structures 120-1 and 120-2 in a coordinated manner during the grasping operations and transfer processes described below. For descriptive purposes, gripper control circuit 147 is depicted in FIG. 2 as including a finger position coordinator 148 and separate finger control circuits (controllers) 149-1 and 149-2. Finger position coordinator 148 receives the trajectory data for each associated targeted food item, calculates associated time-based Y-axis positions of finger structures 120-1 and 120-2 that are required to perform a corresponding grasping operation, and generates finger position data indicating the currently required position of each finger structure. Finger controller 149-1 controls first finger structure 120-1 by generating actuation control signals ACS-F1 in response to associated first target position data TP-F1 received from finger position coordinator 148 and current position data CP-F1 received from encoder unit 152-1 until current position data CP-F1 indicates that the Y-axis position of finger structure 120-1 on guide rod 115 matches the target position indicated by first target position data TP-F1. Similarly, finger controller 149-2 controls second finger structure 120-2 by generating actuation control signals ACS-F2 in response to target position data TP-F2 and current position data CP-F2 received from encoder unit 152-2 until the Y-axis position of finger structure 120-2 matches target position data TP-F2. This finger structure control arrangement is greatly simplified for descriptive purposes and not intended to be limiting unless otherwise specified in the claims. Those skilled in the art will recognize that alternative control arrangements may also be used without departing from the spirit and scope of the invention.

FIGS. 6A to 6D show a portion of robotic gripper 100 during an exemplary food grasping operation performed at the beginning of a food transfer process performed by work cell 80 (shown in FIG. 1). Parenthetical time-based suffixes are utilized in the figures and description below to indicate certain objects or features at sequentially different points in time during the depicted operations and processes. For example, time-based suffixes t0, t1, t2 and t3 are utilized in FIGS. 6A to 6D to indicate the positions of targeted food item 75T and gripper fingers 120-1 and 120-2 at sequential time periods during the depicted grasping operation.

Figure 6A:
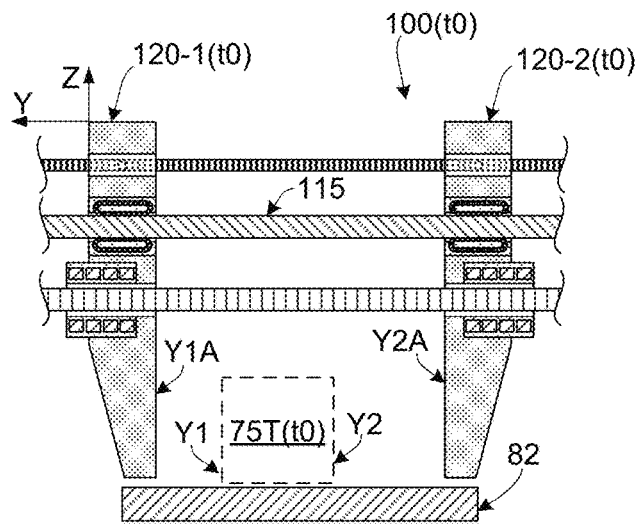
FIGS. 6A, 6B, 6C and 6D are simplified cross-sectional views showing the robotic gripper of FIG. 1 during sequential stages of a food grasping operation according to an exemplary embodiment.

FIG. 6A indicates robotic gripper 100 at a time t0 soon after a targeted food item 75T on conveyor 82 is selected for transfer. At time t0 targeted food item 75T is located significantly upstream from its designated capture location (e.g., as depicted in FIG. 1), and is therefore depicted in dashed lines to indicate that its X-axis position does not yet coincide with that of finger structures 120-1 and 120-2. Note that, for descriptive purposes, finger structures 120-1 and 120-2 are depicted in arbitrary Y-axis positions on guide rod 115 (i.e., finger structure 120-1 is located at Y-axis position Y1A at time t0, and finger structure 120-2 is located at Y-axis position Y2A at time t0). As described above, when targeted food item 75T is selected, associated trajectory data is generated by sensing system 84 (see FIG. 1) that provides finger position coordinator 148 (described above with reference to FIG. 2) with information regarding the predicted Y-axis locations of the opposing side surfaces of targeted food item 75T when conveyor 82 moves it into its associated capture location. For descriptive purposes, these predicted Y-axis locations are indicated as Y1 and Y2.

Figure 6B:
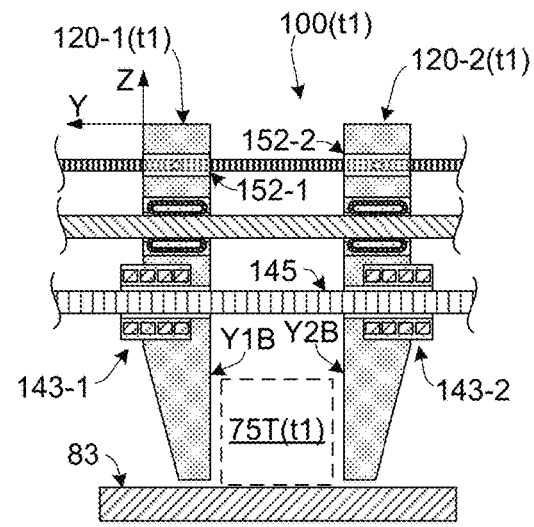

FIG. 6B indicates robotic gripper 100 at a time t1 when targeted food item 75T has been moved on first working surface 83 to a point closer to robotic gripper 100, but before reaching its associated capture location. During the intervening phase (i.e., between times t0 and t1) finger position coordinator 148 (FIG. 2) generates target position data for finger structures 120-1 and 120-2, and finger controllers 149-1 and 149-2 (also described above with reference to FIG. 2) utilize the target position data and current position data received from encoder units 152-1 and 152-2 to generate actuation control signals that cause actuator units 143-1 and 143-2 to generate associated non-contact forces that drive finger structures 120-1 and 120-2 into optimal positions for capturing (grasping) targeted food item 75T. The optimal positions of finger structures 120-1 and 120-2, which are indicated by Y-axis locations Y1B and Y2B, are depicted as being somewhat wider than the calculated width of targeted food item 75T for illustrative purposes.

Figure 6C:
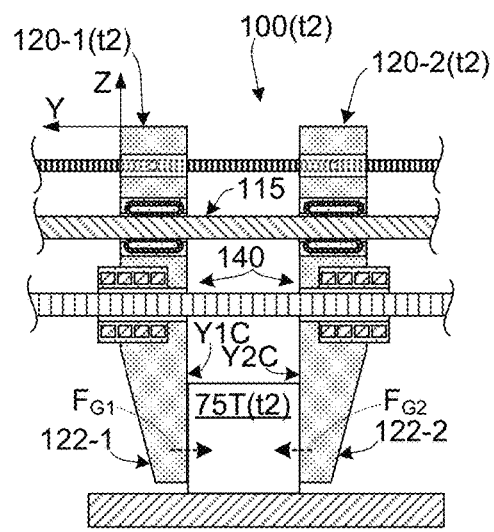

FIG. 6C depicts robotic gripper 100 at a time t2 when targeted food item 75T moves into its associated capture location (e.g., capture location CL shown in FIG. 1) and contact-free actuator system 140 independently drives finger structures 120-1 and 120-2 to perform a grasping operation. In the depicted example, finger structures 120-1 and 120-2 are driven into corresponding linear locations Y1C and Y2C along guide rod 115 such that tip portion 122-1 applies a contact force $F_{G1}$ in the −Y-axis direction on a first side surface of targeted food item 75T, and tip portion 122-2 applies a contact force $F_{G2}$ in the +Y-axis direction on the opposite side surface of targeted food item 75T. In this way finger structures 120-1 and 120-2 collectively apply a grasping force $F_{G1}+F_{G2}$ (i.e., a combination of contact force $F_{G1}$ and opposing contact force $F_{G2}$) on targeted food item 75T.

Figure 6D:
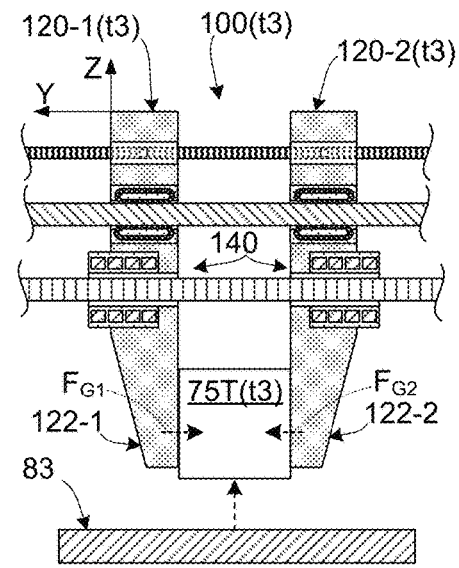

FIG. 6D depicts robotic gripper 100 at a time t3 when targeted food item 75T is lifted from second work surface 83 (e.g., by way of robot mechanism 91, shown in FIG. 1). Note that contact-free actuating system 140 continues to drive finger structures 120-1 and 120-2 such that they maintain grasping force $F_{G1}+F_{G2}$ on targeted item 75T. According to an aspect of the invention, contact-free actuator system 140 and finger structures 120-1 and 120-2 are operably configured such that grasping force $F_{G1}+F_{G2}$ is sufficient to maintain (continuously hold) targeted food item 75T between finger structures 120-1 and 120-2 when targeted food item 75 is lifted from second work surface 83. In this context, the phrase "sufficient grasping force" is defined herein to mean that targeted food item 75T is effectively secured to food-grade robotic gripper 100 by way of contact forces $F_{G1}$ and $F_{G2}$ such that, as indicated in FIG. 6D, while robot mechanism 91 moves food-grade robotic gripper 100 from first work surface 83 to second work surface 78 (shown in FIG. 1), contact-free actuator system 140 drives finger structures 120-1 and 120-2 to sufficient grasping force $F_{G1}+F_{G2}$ to prevent targeted food item 75T from slipping or otherwise separating from between tip portions 122-1 and 122-2. In preferred embodiments tip portions 122-1 and 122-2 are configured to provide significant frictional contact with targeted food item 75T such that sufficient grasping force $F_{G1}+F_{G2}$ can be maintained at a low enough level to prevent deformation damage (e.g., squishing) to targeted food item 75T during the transfer process. That is, tip portions 122-1 and 122-2 continuously apply and maintain sufficient grasping force $F_{G1}+F_{G2}$ from time t3 until the end of the transfer process, when opposite opposing biasing forces move finger structures 122-1 and 122-2 away from each other to release targeted food item 75T.

Figure 7A:
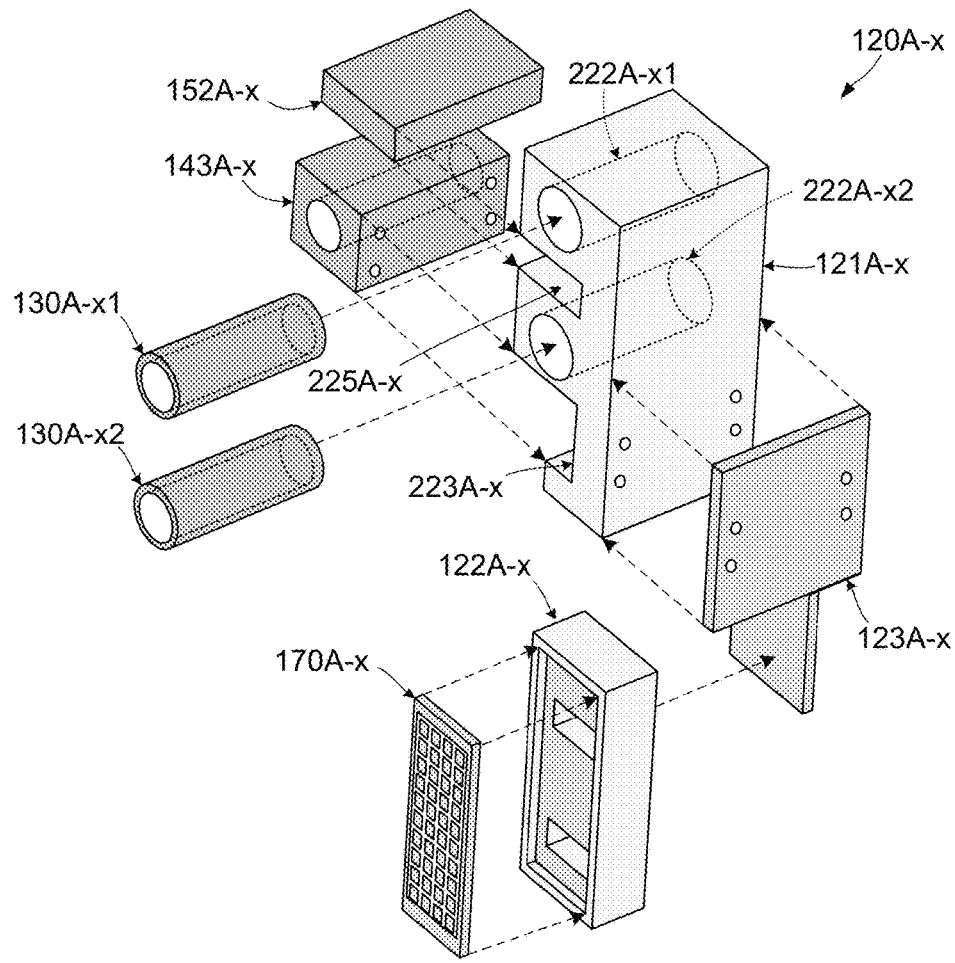
FIGS. 7A and 7B are exploded and assembled perspective views, respectively, showing a finger structure according to another exemplary embodiment of the present invention.
Figure 7B:
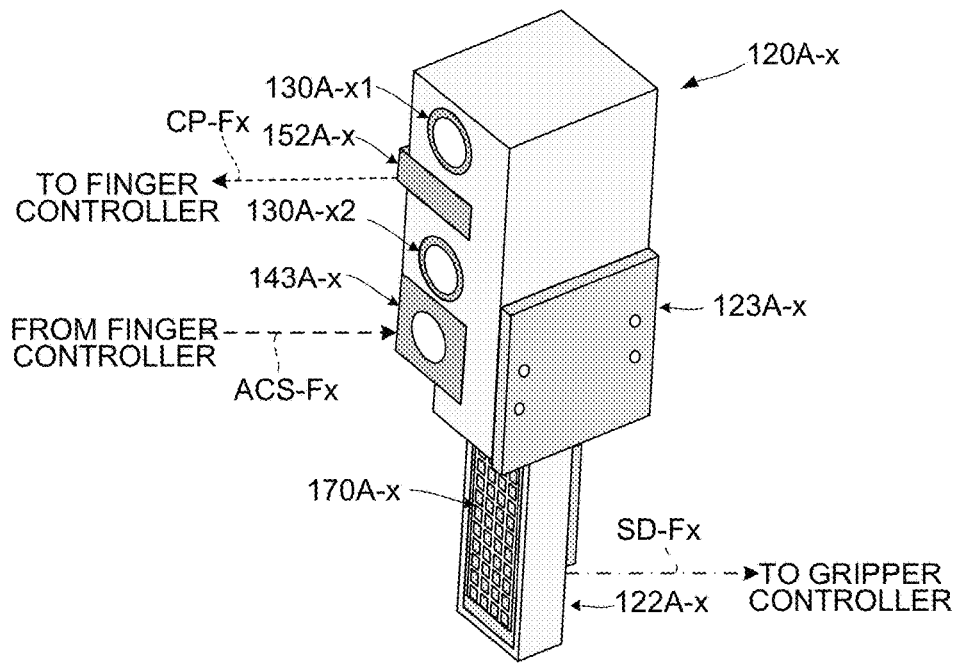

FIGS. 7A and 7B depict a finger structure 120A-x according to another embodiment of the present invention. Similar to the finger structures introduced above, finger structure 120A-x includes a base portion 121A-x, a tip portion 122A-x, an actuator (forcer) unit 143A-x fixedly mounted into a feature 223A-x formed in base portion 121A-x, and an encoder unit 152A-x fixedly mounted into a slot 225A-x formed in base portion 121A-x. As indicated in FIG. 7B, encoder unit 152A-x is configured to generate current position data CP-Fx for use by an associated finger controller as described in additional detail below, and actuator unit 143A-x is configured to receive an actuation control signal ACS-Fx from the finger controller. Actuator unit 143A-x and encoder unit 152A-x are otherwise configured and function essentially as described above with reference to corresponding features of gripper 100 and will therefore not be described in further detail for brevity.

Finger structure 120A-x differs from finger structure 120 (described above) in that it includes two linear bearings 130A-x and 130A-2, which are respectively fixedly mounted into through holes 222A-x1 and 222A-x2 formed in base portion 121A-x. In one embodiment each linear bearing 130A-x and 130A-2 is configured and function essentially as described above with reference to FIG. 3. As described below, linear bearing 130A-x and 130A-2 function to movably connect finger structure 120A-x to two parallel guide rods (not shown).

Finger structure 120A-x further differs from finger structure 120 in that base portion 121A-x is connected to a tip portion 122A-x by way of an intervening finger bracket 123A-x in the manner shown in FIG. 7B. All three of base portion 121A-x, tip portion 122A-x and finger bracket 123A-x comprise food-grade materials such as food-grade ABS plastic and/or stainless steel. An upper portion of bracket 123A-x is connected to base portion 121A-x and tip portion 122A-3 is connected to a lower portion of bracket 123A-x by suitable adhesives and/or fasteners (not shown). In other embodiments base portion 121A-x and tip portion 122A-x may be combined (formed as an integral structure).

Finger structure 120A-x also differs from finger structure 120 in that it includes a sensor array 170A-x mounted onto tip portion 122A-x and configured to generate sensor data SD-F1 that is transmitted to an associated gripper controller in the manner described below. In one embodiment, sensor array 170A-x includes pressure sensors that are configured to measure the contact force applied by finger structure 120A-x on a targeted food item during a grasping operation, whereby sensor data SD-Fx facilitates verifying that a sufficient grasping force is being maintained on the targeted food item. In other embodiments, sensor array 170A-x is configured to generate multimodal sensor data (e. g., data respectively generated by two or more different sensor types, or two or more types of sensor measurement) in response to stimuli applied or received by sensor array 170A-x, thereby facilitating additional beneficial functions described in co-owned and co-pending U.S. patent application Ser. No. 16/573,811 entitled Multimodal Sensor Array For Robotic Systems, which is incorporated herein by reference in its entirety.

Figure 8A:
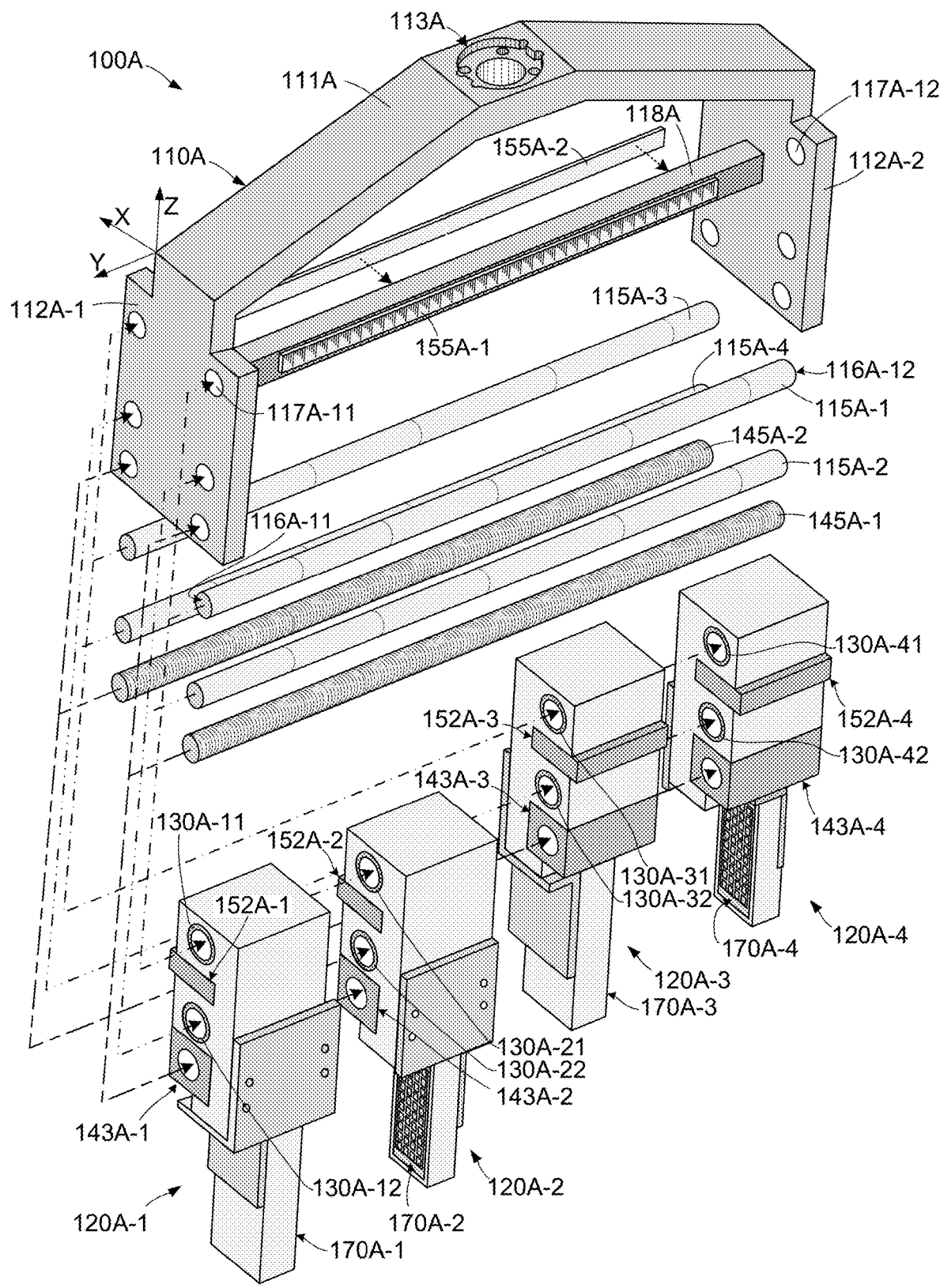
FIGS. 8A and 8B are exploded and assembled perspective views, respectively, showing a food-grade robotic gripper utilizing the finger structure of FIG. 7 according to another exemplary embodiment of the present invention.
Figure 8B:
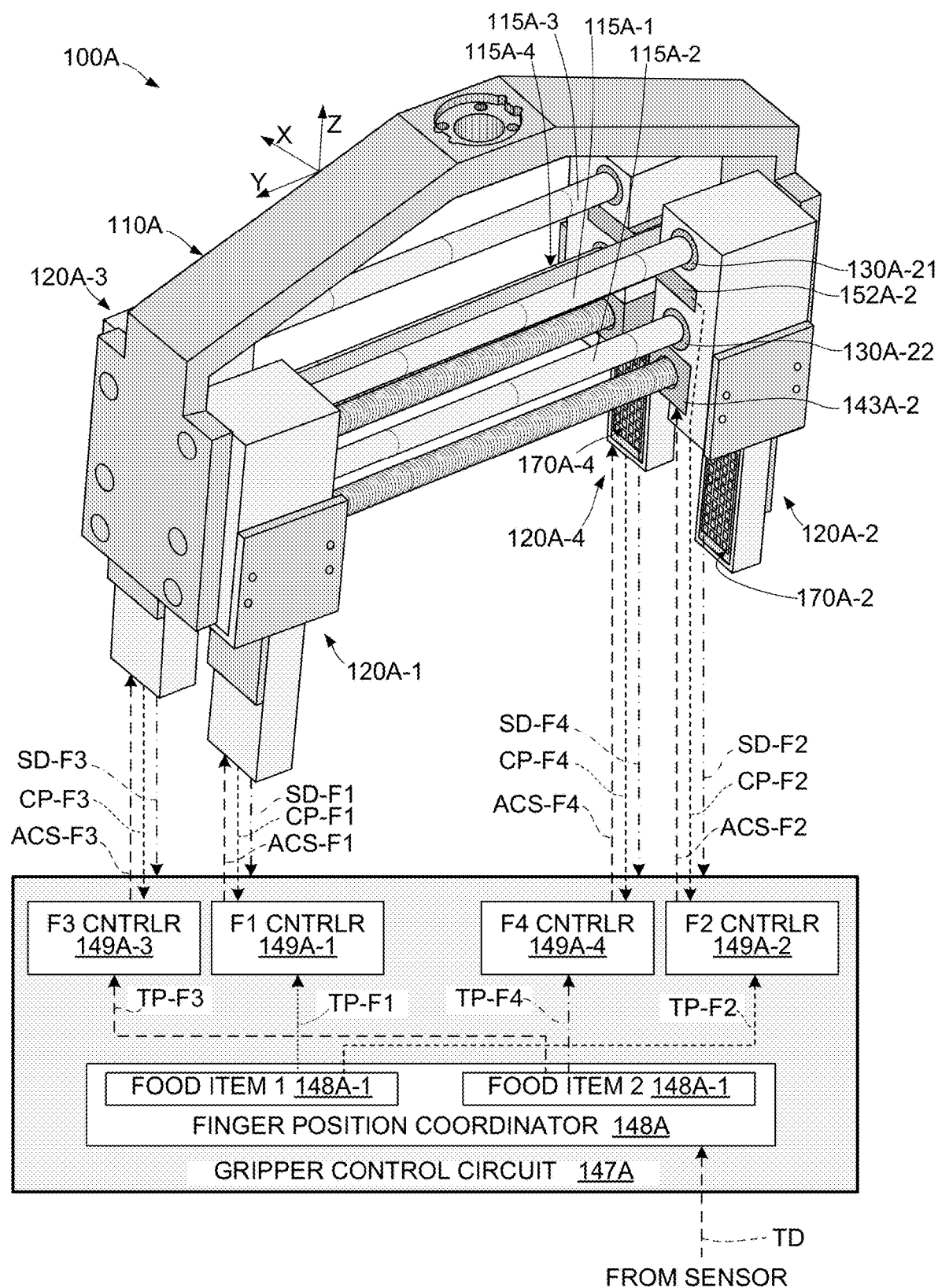

FIGS. 8A and 8B depict a robotic gripper 100A according to another exemplary embodiment in which two pairs of finger structures are provided to facilitate the simultaneous transfer of two food items during each transfer process. Like the embodiment described above, robotic gripper 100A generally includes a frame 110A, a first pair of finger structures 120A-1 and 120A-2, a second pair of finger structures 120A-3 and 120A-4, and a contact-free actuator system including a gripper control circuit 147A. Note that each finger structure 120A-1 to 120A-4 is either identical to or a mirror image of finger structure 120A-x, which is described above with reference to FIGS. 7A and 7B, and therefore the various features and components of each finger structure 120A-1 to 120A-4 mentioned below refer to corresponding features and components of finger structure 120A-x (i.e., with relevant components identified by the suffixes -1, -2, -3 and -4 instead of the -x suffix used in FIGS. 7A and 7B.

Referring to the upper portion of FIG. 8A, frame 110A generally includes an elongated base portion 111A having a connection feature 113A, spaced-apart flanges 112A-1 and 112A-2 that are integrally or otherwise fixedly connected to opposite ends of base portion 111A, four guide rods 115A-1 to 115A-4 that are respectively fixedly connected to the flanges 112A-1 and 112A-2, and a cross beam 118A that connected between central locations of flanges 112A-1 and 112A-2. Guide rod 115A-1 is connected such that a first end 116A-11 of guide rod 115A-1 is connected to flange 112A-1 at mounting location 117A-11 and a second end 116A-12 of guide rod 115A-1 is connected to flange 112A-2 at mounting location 117A-12. Similarly, guide rod 115A-1 is connected between flanges 112A-1 and 112A-2 at the indicated location below (i.e., in the –Z-axis direction) guide rod 115A-1. Guide rods 115A-3 and 115A-4 are connected to mounting locations that are parallel to but displaced from guide rods 115A-1 and 115A-2 in the X-axis direction. A pair of stator rods 145A-1 and 145A-2 are disposed below guide rods 115A-2 and 115A-4, respectively. Encoder scales 155A-1 and 155A-2 are secured to opposing side surfaces of cross beam 118A.

Each finger structure 120A-1 to 120A-4 is linearly movably connected to frame 110A by way of corresponding pairs of linear bearings, generates current position data using an associated encoder unit, and is driven by an associated actuator unit in the manner described above. For example, as indicated in FIG. 8B, finger structure 120A-2 is linearly movably connected to frame 110A by way of corresponding linear bearings 130A-21 and 130A-22, which are operably connected to guide rods 115A-1 and 115A-2, utilizes encoder unit 152A-2 to generate sensor data SD-F2, and is driven by biasing forces generated in response to actuation control signals ACS-F2 by actuator unit 143A-2, which is electromagnetically coupled to stator rod 145A-1. In a similar manner, finger structure 120A-1 is linearly movably connected to frame 110A by way of corresponding linear bearings 130A-11 and 130A-12 (shown in FIG. 8A) also connected to guide rods 115A-1 and 115A-2, utilizes encoder unit 152A-1 to generate sensor data SD-F2, and is driven by actuator unit 143A-2 and stator rod 145A-1 in response to actuation signals ACS-F1. Finger structure 120A-3 is linearly movably connected to guide rods 115A-3 and 115A-4 by linear bearings 130A-31 and 130A-32 and includes encoder unit 152A-3 and actuator unit 143A-3, and finger structure 120A-4 is linearly movably connected to guide rods 115A-3 and 115A-4 by way of corresponding linear bearings 130A-41 and 130A-42 and includes encoder unit 152A-4 and actuator unit 143A-4, where actuator units 143A-3 and 143A-4 are electromagnetically coupled to stator rod 145A-2. In this arrangement, guide rods 115A-3 and 115A-4 are parallel to and displaced from guide rods 115A-1 and 115A-2 in the X-axis (first orthogonal) direction (i.e., guide rod 115A-3 is positioned downstream from guide rod 115A-1 when robotic gripper 100A is operably positioned over a first working surface, as depicted in FIG. 9).

Referring to the lower portion of FIG. 8B, gripper control circuit 147A is configured to control the two pairs of finger structures such that each pair of finger structures grasps an associated targeted food item during each transfer process. In this case, finger position coordinator 148A receives trajectory data TD from a video system or other sensor (e.g., sensing system 84A, shown in FIG. 9) that includes trajectory data for two targeted food items (e.g., food items 75T1 and 75T2, also shown in FIG. 9). Finger position coordinator 148A includes a first food item (FOOD ITEM 1) section 148A-1 that generates target information TP-F1 and TP-F2 and includes a second food item (FOOD ITEM 2) section 148A-2 that generates target information TP-F3 and TP-F4. Gripper control circuit 147A also includes four finger controller circuits 149A-1 to 149A-4 that control finger structures 120A-1 to 120A-4 using actuation control signals ACS-F1 to ACS-F4 in the manner described above. For example, finger controller 149A-2 receives target position data TP-F2 from section 148A-1 and current position data CP-F2 from encoder unit 152A-2 (which is positioned to read position data from encoder scale 155A-1, shown in FIG. 8A), and generates/transmits associated actuation control signal ACS-F4 to actuator unit 143A-2, thereby controlling finger structure 120A-2.

In one embodiment the associated sensor arrays provided on each associated pair of finger structures are cooperatively configured to measure the gripping force generated by each finger structure pair, and gripper control circuit 147A is further configured to generate actuation control signals in accordance with the measured gripping force data provided by the associated sensor arrays. For example, associated sensor arrays 170A-1 and 170A-2 are disposed on finger structures 120A-1 and 120A-2 such that they face each and are configured as described above to generate sensor data SD-F1 and SD-F2 that collectively measures or otherwise identifies the gripping force applied by finger structures 120A-1 and 120A-2 on a first targeted food item. Similarly, and sensor arrays 170A-3 and 170A-4 are configured to generate sensor data SD-F3 and SD-F4 that collectively identifies the gripping force applied by finger structures 120A-3 and 120A-4 on a second targeted food item. As indicated in FIG. 8B, sensor signals SD-F1 to SD-F4 are provided to gripper control circuit 147A and are utilized, for example, by finger position coordinator 147A to position associated pairs of finger structures closer together (e.g., when a measured gripping force is lower than a stored optimal value) or further apart (e.g., when a measured gripping force is higher than a stored optimal value).

Figure 9:
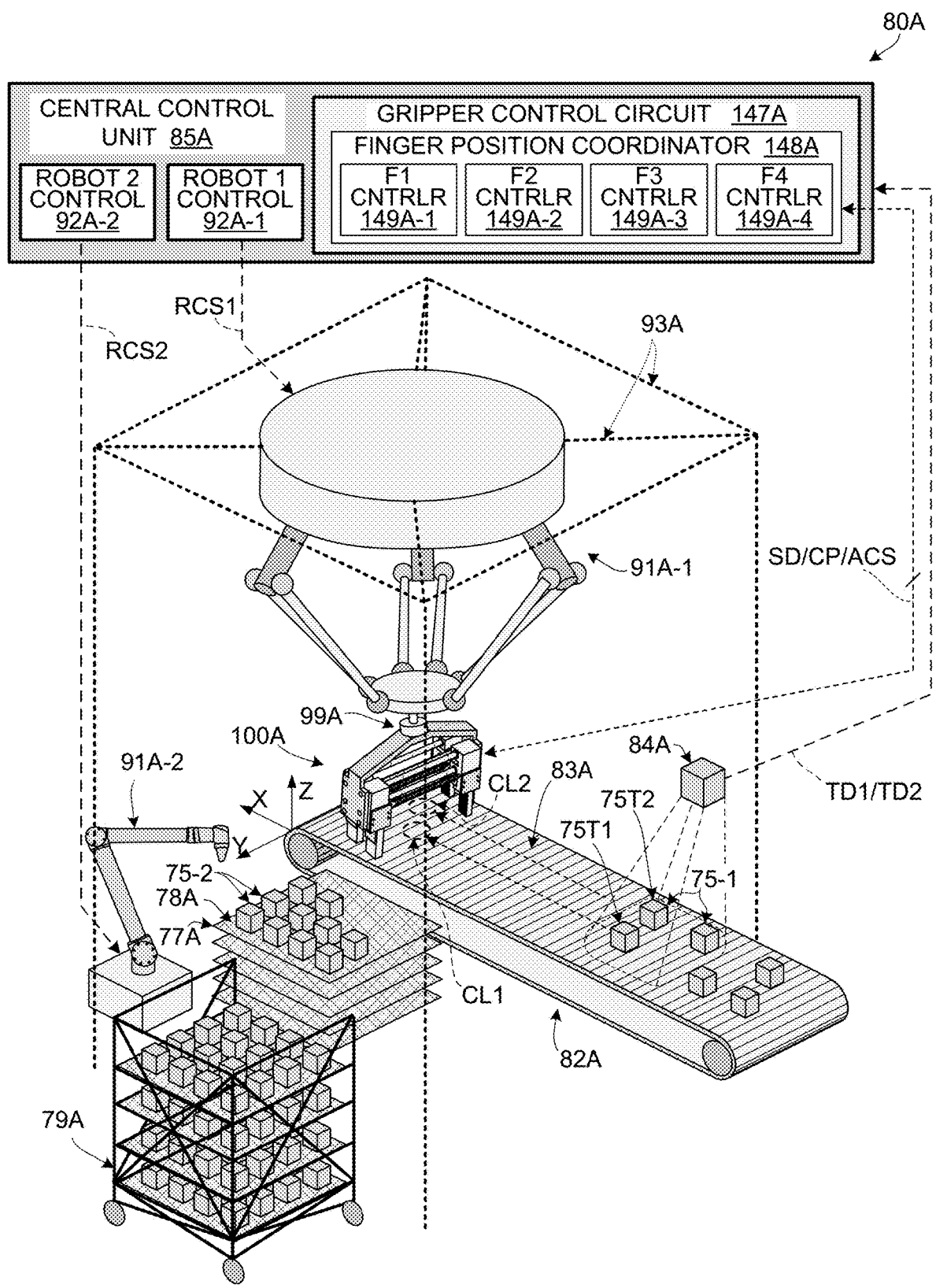
FIG. 9 depicts an automated food production work cell utilizing a food-grade robotic gripper according to another exemplary embodiment of the present invention.

FIG. 9 shows an automated food production work cell 80A according to another practical embodiment that utilizes food-grade robotic gripper 100A (described above) to simultaneously transfer multiple food items (e.g., targeted food items 75T1 and 75T2) from a conveyor 82A (first working surface 83A) to a processing tray 77A (second working surface 78A) during a single transfer process. Food production work cell 80A is like work cell 80 (described above with reference to FIG. 1) in that incoming food items 75-1 are conveyed on an upward facing work surface 83A of a conveyor 82A and analyzed by a sensing system 84A, and robotic gripper 100A is connected to an attachment member 99A of a robot mechanism 91A-1 and is manipulated by robot mechanism 91A-1 in substantially the same manner as described above to transfer targeted food items from first working surface 83A to second working surface 78A.

Food production work cell 80A differs from work cell 80 in several respects. For example, sensing system 84A is modified to select/identify two targeted food items and to calculate separate trajectory data for each targeted food item. In this example sensing system 84A selects/identifies targeted food items 75T1 and 75T2, generates trajectory data TD1 including a first capture location CL1 and associated capture time for targeted food item 75T1, and generates trajectory data TD2 including an associated second capture location CL2 and capture time for targeted food item 75T2.

Food production work cell 80A also differs from work cell 80 in that robot mechanism 91A-1 is a food-grade parallel linkage robot that is supported over conveyor 82A by a gantry frame 93A, and in that work cell 80A includes a second arm-type robot mechanism 91A-2 that is configured to move full processing trays 77A onto a portable rack 79A for further processing. An advantage provided by this work cell arrangement is that gantry-mounted, commercially available food-grade parallel linkage robots, such as the model M-2iA 3SL robot provided by Fanuc America Corporation of Rochester Hills, Mich., USA, facilitate precise and high-speed transfer processes while providing valuable space for incoming and outgoing food processing equipment (such as second arm-type robot mechanism 91A-2, processing trays 77A and portable rack 79A).

In one embodiment, work cell 80A includes a central control unit 85A (e.g., a computer) that implements at least a portion of gripper control circuit 147A, a first robot controller (ROBOT 1 CONTROL) 92A-1, and a second robot controller (ROBOT 2 CONTROL) 92A-2. Gripper control circuit 147A includes finger position coordinator 148A and finger control circuits 149A-1 to 149A-4, which are configured to operate as described above with reference to FIG. 1B. That is, gripper control circuit 147A receives trajectory data TD from sensing system 84A, pressure sensor data SD from the four pressure sensor arrays 170A-1 to 170A-4 respectively mounted on finger structures 120A-1 to 120A-4 (see FIG. 8A) and current position data CP from the four encoder sensors 152A-1 to 152A-4 respectively mounted on finger structures 120A-1 to 120A-4 (see FIG. 8A), and generates actuation control signal data in the manner described above which is then transmitted to the four actuator units 143A-1 to 143A-4 respectively mounted on finger structures 120A-1 to 120A-4 (see FIG. 8A). Robot control circuits 92A-1 and 92A-2 respectively generate robot control signals RCS1 and RCS2, which are utilized to control the operations of robot mechanisms 91A-1 and 91A-2, respectively. In one embodiment, one or more of robot control circuits 92A-1 and 92A-2 utilize trajectory data TD (or other sensor data) in the generation of one or more of robot control signals RCS1 and RCS2. In one embodiment central control unit 85A is configured to coordinate the operations of robot control unit 92A-1 and gripper control circuit 147A such that robotic gripper 100A performs the multiple food item transfer process described below with reference to FIGS. 10A to 10F.

FIGS. 10A to 10F depict a multiple food item transfer operation performed by work cell 80A according to an exemplary embodiment. Note that each figure shows a modified top view taken from a perspective point located over robotic gripper 100A, with robot mechanism 90A-1 and other structural details of robotic gripper 100A and work cell 80A omitted for clarity.

Figure 10A:
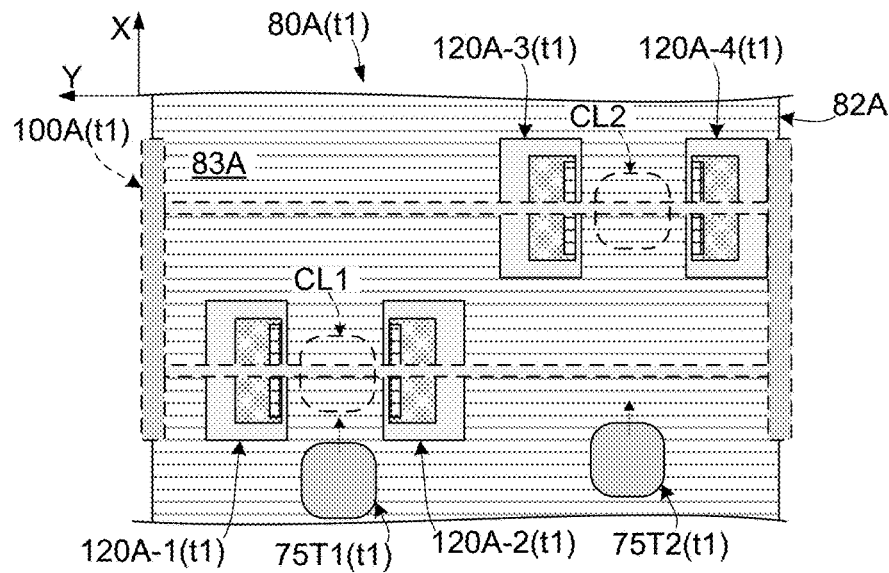
FIGS. 10A, 10B, 10C, 10D, 10E and 10F are simplified partial top views depicting an exemplary transfer process performed by the automated food production work cell of FIG. 9.

FIG. 10A depicts a portion of work cell 80A at time t1 when robotic gripper 100A is positioned over conveyor 82A and prior to the two grasping operations performed during the two-item transfer process. At this point targeted food items 75T1 and 75T2 are supported on working surface 83A and conveyed in the X-axis direction (as indicated by the dashed line arrows extending upward from each food item) but have not yet reached their respective capture locations CL1 and CL2, which have been previously determined as described above. To facilitate the impending grasping operations, gripper control circuit 147A (see FIG. 9) is configured to independently position finger structures 120A-1 and 120A-2 outside the Y-axis boundaries of capture location CL1, and to independently position finger structures 120A-3 and 120A-4 outside the Y-axis boundaries of capture location CL2.

Figure 10B:
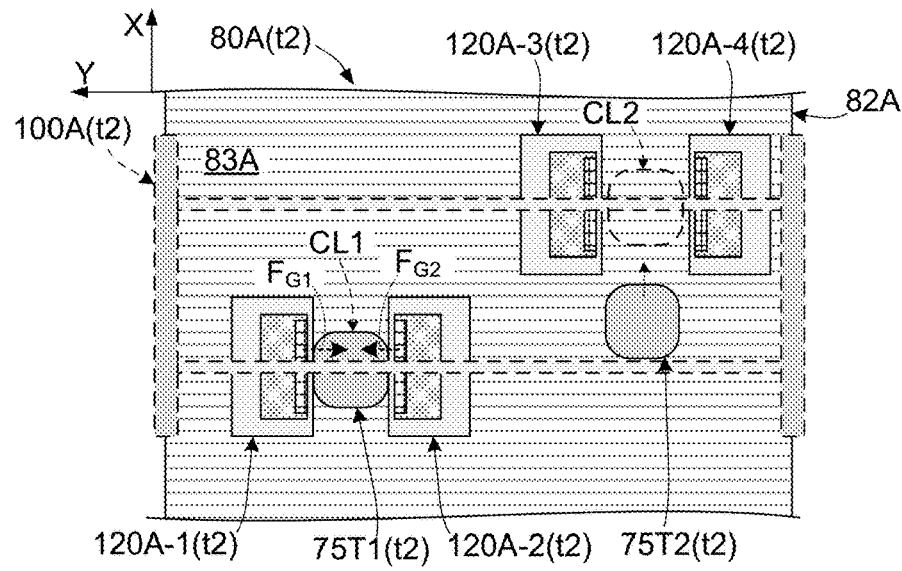

FIG. 10B depicts a portion of work cell 80A at time t2 when first targeted food item 75T1 is conveyed by conveyor 82A into its pre-calculated capture location CL1 and gripper control circuit 147A (see FIG. 9) drives finger structures 120A-1 and 120A-2 to perform a first grasping operation. Specifically, gripper control circuit 147A (see FIG. 9) is configured to drive finger structures 120A-1 and 120A-2 toward targeted food item 75T1 until they respectively apply opposing contact forces $F_{G1}$ and $F_{G2}$ on opposite side surfaces of targeted food item 75T1, thereby generating a combined grasping force $F_{G1}+F_{G2}$ that secures targeted food item 75T1 between finger structures 120A-3 and 120A-4. Note that, at time t2, second targeted food item 75T2 continues to be conveyed on work surface 83A in the X-axis direction toward its associated pre-calculated capture location CL2.

Figure 10C:
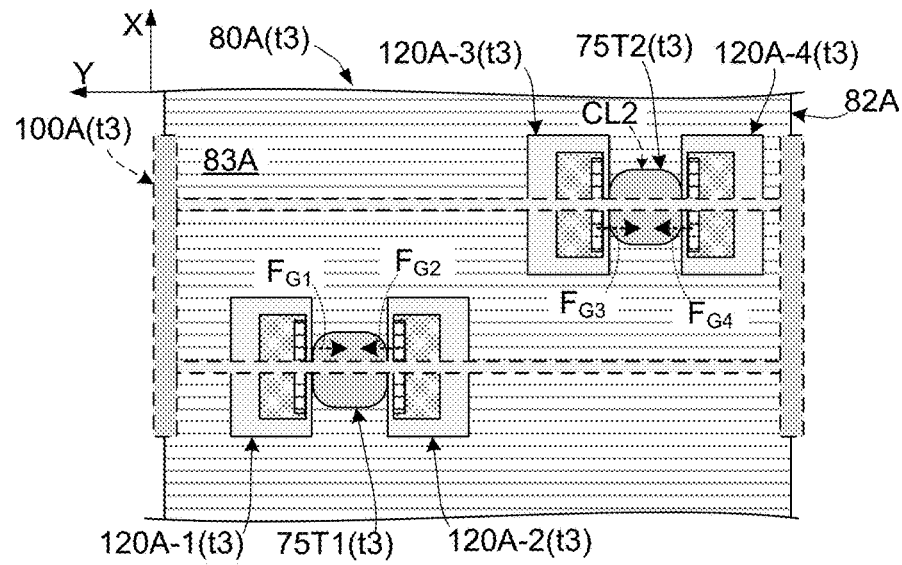

FIG. 10C depicts a portion of work cell 80A at time t3 when second targeted food item 75T2 is conveyed by conveyor 82A into its pre-calculated capture location CL2 and gripper control circuit 147A (see FIG. 9) drives finger structures 120A-3 and 120A-4 to perform a second grasping operation. That is, finger structures 120A-3 and 120A-4 are driven in the manner described above to apply opposing contact forces $F_{G3}$ and $F_{G4}$ on opposite side surfaces of targeted food item 75T2, thereby generating a grasping force $F_{G3}+F_{G4}$ that secures targeted food item 75T2 between finger structures 120A-3 and 120A-4. Note that finger structures 120A-1 and 120A-2 are controlled such that suitable grasping force $F_{G1}+F_{G2}$ maintains targeted food item 75T1 between finger structures 120A-1 and 120A-2. In one embodiment conveyor 82A is constructed such that work surface 83A slips across the bottom surfaces of food items 75T1 and 75T2 at time t3. In other embodiments robotic gripper 100A may be modified to lift food items from the first conveying surface when grasped between associated finger structures.

Figure 10D:
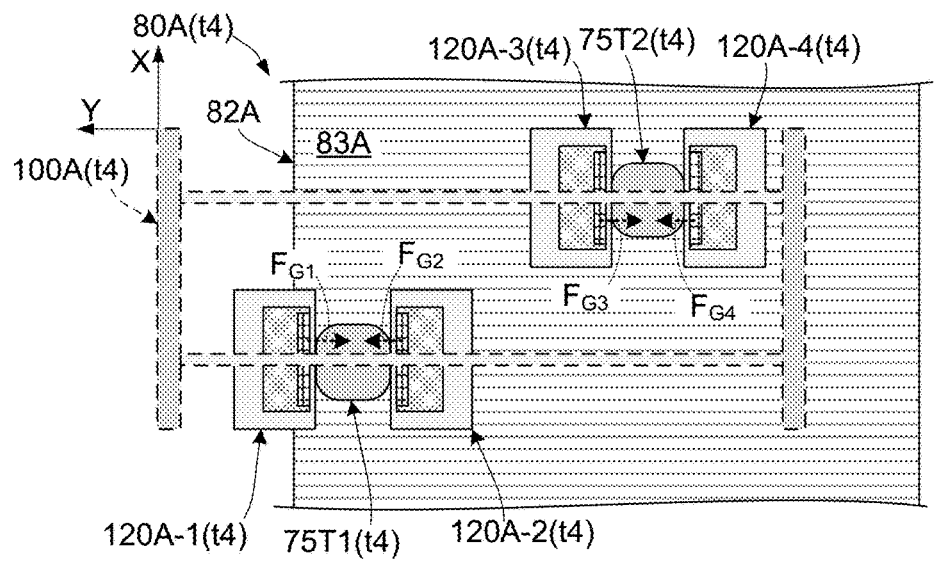
Figure 10E:
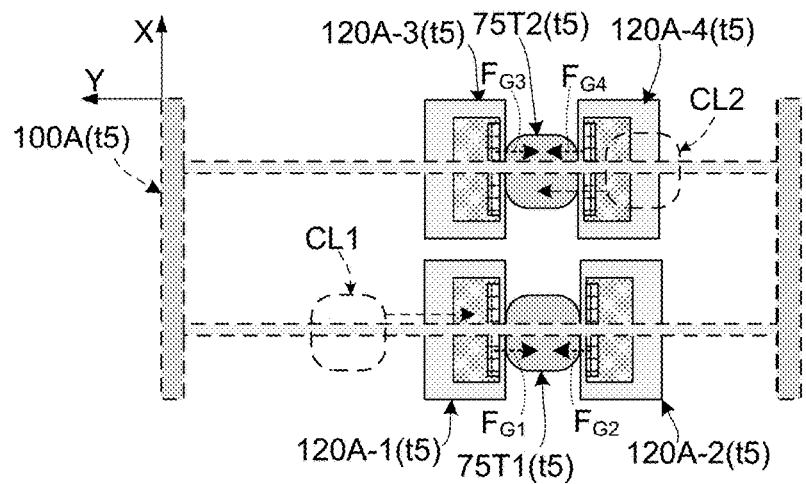
Figure 10F:
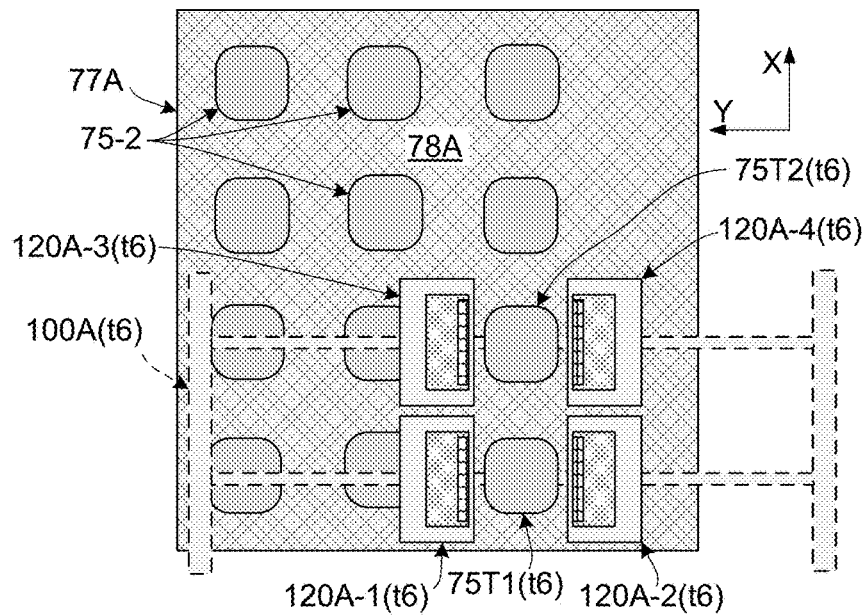

FIG. 10D depicts a portion of work cell 80A at time t4 immediately after robot mechanism 91A (see FIG. 9) lifts robotic gripper 100A upward from conveyor 82 to facilitate the transfer of targeted food items 75T1 and 75T2 from first working surface 83A to second working surface 78A (shown in FIG. 10F). Note that gripper control circuit 147A (see FIG. 9) is configured to drive finger structures 120A-1 to 120A-4 such that the application of suitable grasping forces $F_{G1}+F_{G2}$ and $F_{G3}+F_{G4}$ on targeted food items 75T1 and 75T2 is maintained during the lifting and transporting operations, thereby preventing food items 75T1 and 75T2 from slipping from the grasp applied by finger structures 120A-1 to 120A-4 while being transported between the two work surfaces.

FIG. 10E depicts robotic gripper 100A at time t5 while it is being moved by robot mechanism 91A-1 (see FIG. 9) during the transfer of food items 75T1 and 75T2 from first work surface 83A (shown in FIG. 10D) to second work surface 77A (shown in FIG. 10F). In a presently preferred embodiment, gripper control circuit 147A (see FIG. 9) is further configured to drive finger structures 120A-1 to 120A-4 such that targeted food items 75T1 and 75T2 become aligned in the X-axis direction while maintaining suitable grasping forces $F_{G1}+F_{G2}$ and $F_{G3}+F_{G4}$ on targeted food items 75T1 and 75T2 during the transfer process. In the depicted example, the X-axis alignment is achieved by moving targeted food item 75T1 in the −Y-axis direction (i.e., to the right in FIG. 10E, as indicated by the dashed line arrow extending from capture region CL1), and by moving targeted food item 75T2 in the +Y-axis direction (i.e., to the left in FIG. 10E, as indicated by the dashed line arrow extending from capture region CL2). Note that the finger structures of each finger structure pair is moved in unison during the alignment process to prevent dropping food items 75T1 and 75T2 during transfer (e.g., finger structures 120A-1 and 120A-2 are simultaneously moved in the −Y-axis direction such that contact forces $F_{G1}$ and $F_{G2}$ remain substantially constant, thereby maintaining suitable grasping force $F_{G1}+F_{G2}$ during transfer).

FIG. 10F depicts a portion of work cell 80A when robotic gripper 100A is positioned over process tray 77 and immediately after finger structures 120A-1 to 120A-4 have been driven by opposite opposing biasing forces to release food items 75T1 and 75T2 onto second work surface 78A, thus completing the exemplary transfer process. Note that configuring robotic gripper 100A to align targeted food items 75T1 and 75T2 during the transfer process (as described above with reference to FIG. 10E) further facilitates reduced total operating costs by simplifying the process of providing transferred food items 75-2 in a uniform predetermined arrangement (e.g., with rows aligned in Y-axis direction and columns aligned in the X-axis direction). That is, the final phase of the transfer process is simplified by driving finger structures 120A-1 to 120A-4 to align food items 75T1 and 75T2 in the X-axis direction while robotic gripper 100A is being moved between the first and second work surfaces, thereby minimizing the number of robotic operations that must be performed by robot mechanism 91A (see FIG. 9) during this final phase. By way of contrast, if food items 75T1 and 75T2 remained in their original Y-axis locations during the transfer process, then robot mechanism 91A would be required to perform two operations to deliver food items 75T1 and 75T2 in the rows-and-columns arrangement shown in FIG. 10F: that is, robot mechanism 91A would be required to perform a first operation to position robotic gripper 100A such that food item 75T1 is released in its designated location on surface 78A, and to then perform a second operation to position robotic gripper 100A before releasing food item 75T2 in its designated location. By aligning food items during transfer in this manner, robotic gripper 100A facilitates the simultaneous delivery/release of multiple food items using a single robot operation, thereby minimizing wear and tear damage to the robot mechanism 91A and thus reducing total operating costs.

The exemplary embodiments and transfer processes presented above are believed to adequately demonstrate the beneficial aspects of the present invention but are not intended to limit the claims unless otherwise specified.

Figure 11:
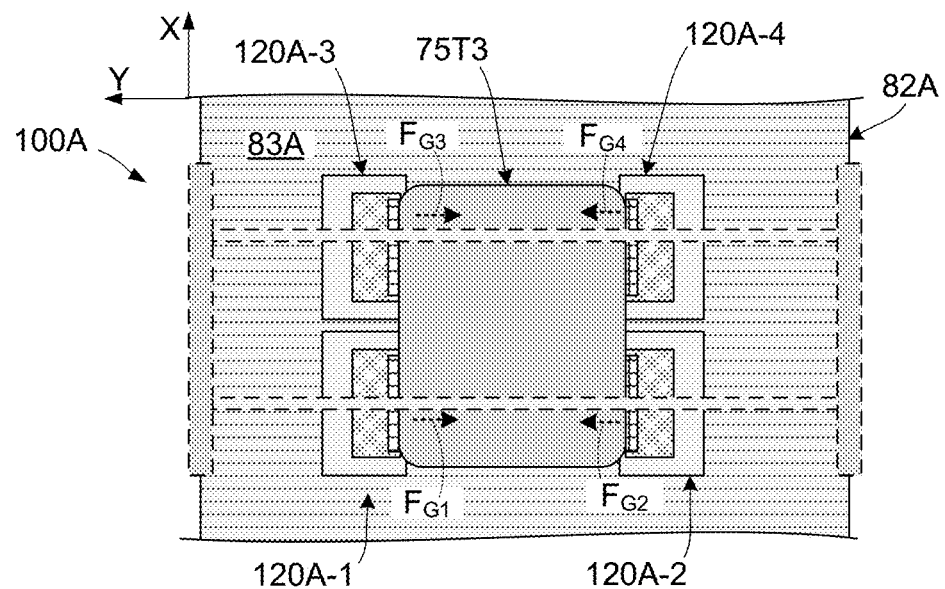
FIG. 11 is a simplified partial top view depicting another exemplary transfer process performed by the automated food production work cell of FIG. 9.

For example, FIG. 11 depicts robotic gripper 100A performing an alternative exemplary transfer process in which all four finger structures 120A-1, 120A-2, 120A-3 and 120A-4 are driven to apply contact forces $F_{G1}$, $F_{G2}$, $F_{G3}$ and $F_{G4}$, respectively, on a single large food item 75T3. This demonstrates another beneficial aspect of providing two or more pairs of finger structures on separate guide rails; i.e., this arrangement allows the separate use of each finger structure pair to simultaneously transfer two or more smaller food items (e.g., as described above with reference to FIGS. 10A to 10F), and also allows two or more finger structure pairs to combine their contact forces to facilitate transfer processes involving larger and/or heavier food items. In this case, the contact forces applied by finger structures 120A-1 to 120A-4 generates a combined grasping force that is approximately two times that generated by one finger structure pair alone.

Figure 12:
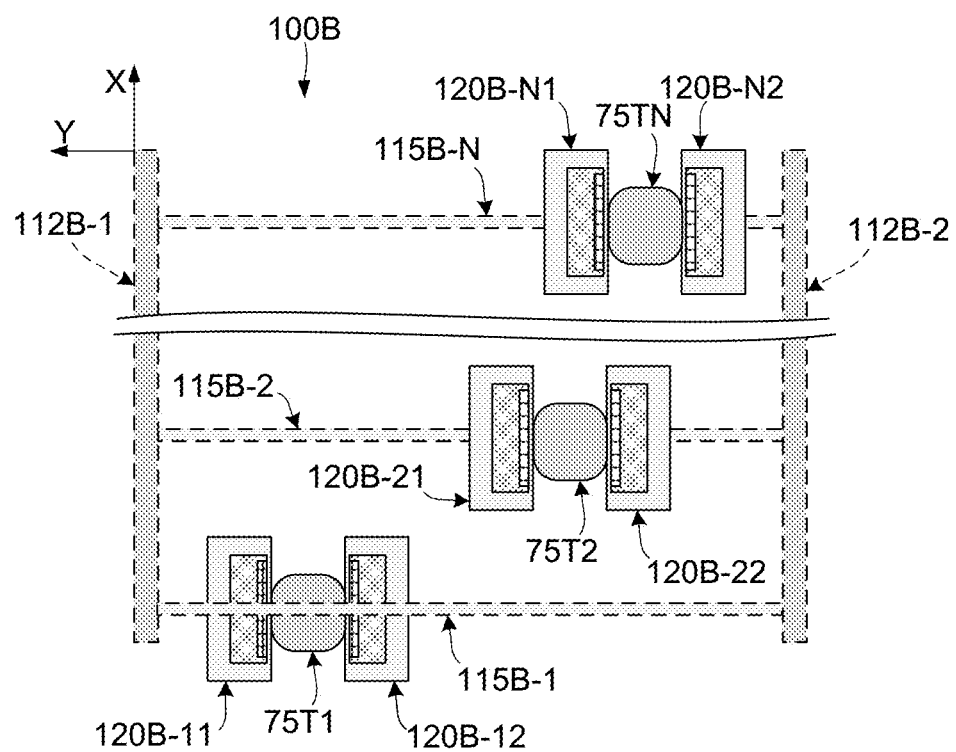
FIG. 12 is a simplified partial top view depicting a food-grade robotic gripper according to an alternative embodiment of the present invention.

FIG. 12 depicts a robotic gripper 100B according to an exemplary alternative embodiment in which the basic gripper configuration described above may be easily expanded to simultaneously capture any number of food items. Like the embodiment described above with reference to FIGS. 8A and 8B, robotic gripper 100B includes a first finger structure pair formed by finger structures 120B-11 and 120B-12 that are operably connected to a first guide rod 115B-1 connected between spaced-apart flanges 112B-1 and 112B-2, and a second finger structure pair formed by finger structures 120C-21 and 120C-22 operably connected to a second guide rod 115B-2 also connected between flanges 112B-1 and 112B-2. As indicated above guide bar 115B-2, any number of additional guide bars and finger structure pairs (indicated by guide bar 115B-N and finger structures 120B-N1 and 120B-N2) may be added to robotic gripper 100B, thereby enabling the simultaneous transfer of any number of food items 75T1, 75T2 ... 75TN during a single transfer process. Accordingly, this example indicates how the novel gripper arrangement of the present invention may be further modified to increase operating efficiency without introducing mechanical connections that may disqualify gripper 100B for food production processes.

Figure 13:
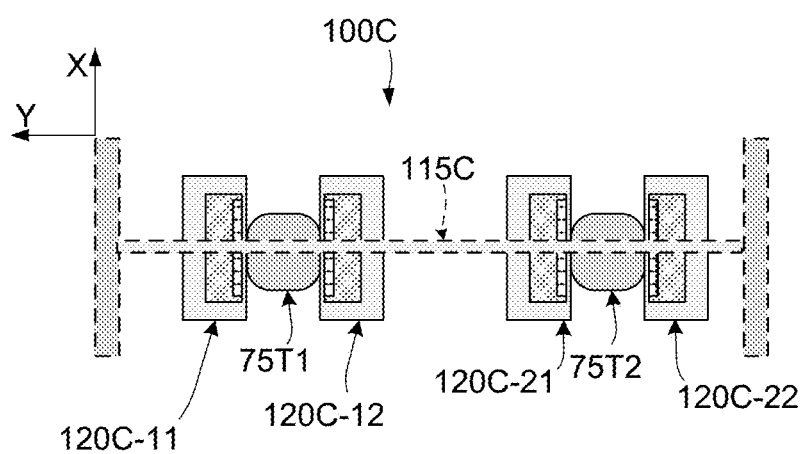
FIG. 13 is a simplified partial top view depicting a food-grade robotic gripper according to another alternative embodiment of the present invention.

FIG. 13 depicts a robotic gripper 100C according to another alternative embodiment that depicts how two or more pairs of finger structures can be disposed on a single guide rod 115C and utilized to simultaneously capture two or more food items. In the depicted embodiment, a first finger structure pair is formed by finger structures 120C-11 and 120C-12, and a second finger structure pair is formed by finger structures 120C-21 and 120C-22. By independently driving each of the finger structures using the techniques described above, FIG. 13 shows that finger structures 120C-11 and 120C-12 may be utilized to grasp a first targeted food item 75T1 and finger structures 120C-21 and 120C-22 utilized to simultaneously grasp a second targeted food item 75T2. This example indicates how the novel gripper arrangement of the present invention may be further modified to increase operating efficiency without significantly increasing the total weight of robotic gripper 100C over the embodiment described above with reference to FIG. 1.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A robotic gripper for an automated production system, said automated production system including a robot mechanism, the robotic gripper comprising:
 a frame including a base portion that is operably configured for connection to an attachment member of the robot mechanism first and second flanges that are fixedly connected to the base portion, at least one guide rod having a first end portion fixedly connected to the first flange and an opposing a second end portion fixedly connected to the second flange;
 first and second finger structures independently movably connected to the guide rod by way of first and second linear bearings such that the first finger structure is constrained to move linearly along the guide rod by the first linear bearing between the first flange and the second finger structure, such that the second finger structure is constrained to move linearly along the guide rod by the second linear bearing between the first finger structure and the second flange, wherein said first and second finger structures include first and second tip portions; and
 a contact-free actuator system configured to independently drive said first and second finger structures to corresponding linear locations along the guide rod such that said first and second tip portions collectively apply a sufficient grasping force on a targeted food item to facilitate lifting said targeted food item from a work surface,
 wherein the frame, the first and second finger structures and the first and second linear bearings consist essentially of food-grade materials,
 wherein the contact-free actuator system comprises:
 a first actuator unit having a first actuator housing fixedly connected to the first finger structure and including a first transducer device;
 a second actuator unit having a second actuator housing fixedly connected to the second finger structure and including a second transducer device; and
 an elongated stator fixedly connected to the frame and including a plurality of permanent magnets aligned in parallel with the guide rod, and
 wherein said first transducer device and said second transducer device are independently operably electromagnetically coupled to the plurality of permanent magnets such that, when first actuator control signals are respectively transmitted to said first and second transducer devices, said first and second actuator units bias said first and second finger structures in a first linear direction, and when second actuator control signals are respectively transmitted to said first and second transducer devices said first and second actuator units bias said first and second finger structures in a second linear direction, said second linear direction being opposite to said first linear direction.

2. The robotic gripper of claim 1, wherein said first linear bearing is disposed in a through-hole defined in a base portion of the first finger structure and said first linear bearing comprises:
 a housing having an outer surface and an inner cylindrical surface, said outer surface being fixedly connected to said first finger structure and said inner cylindrical surface surrounding a portion of said guide rod; and
 a plurality of ball bearings movably disposed within a race defined in said housing such that a portion of said plurality of ball bearings extend from the inner cylindrical surface and contact said guide rod, wherein said plurality of ball bearings comprise stainless steel.

3. The robotic gripper of claim 1,
 wherein each of said first and second actuator housings respectively include first and second cylindrical inner surfaces defining first and second central cylindrical openings, respectively, and
 wherein said elongated stator comprises a stator rod that extends through said first and second central cylindrical openings such that an outer cylindrical surface of said stator rod is spaced from said first and second cylindrical inner surfaces of said of said first and second actuator housings.

4. The robotic gripper of claim 1, further comprising a contact-free encoding system configured to independently detect movement of said first and second finger structures on said guide rod.

5. The robotic gripper of claim 4, wherein the contact-free encoding system comprises:
 an encoder scale including an elongated base having position data disposed thereon, said elongated base being fixedly connected to the frame; and
 a first encoder unit fixedly connected to the first finger structure such that an air gap is maintained between the first encoder unit and the encoder scale, wherein said first encoder unit includes a sensor that is electromagnetically coupled to the encoder scale and is operably configured to generate a signal indicating a current position of the first finger structure on the guide rod.

6. The robotic gripper of claim 1,
 wherein said at least one guide rod includes a first guide rod and a second guide rod connected in parallel between the first and second flanges, and
 wherein the first and second finger structures are movably connected to the first guide rod by way of said first and second linear bearings and are movably connected to the second guide rod by way of third and fourth linear bearings, respectively.

7. The robotic gripper of claim 6, further comprising:
 third and fourth guide rods connected in parallel between the first and second flanges;
 a third finger structure movably connected to the third and fourth guide rods by way of fifth and sixth linear bearings, respectively; and
 a fourth finger structure movably connected to the third and fourth guide rods by way of seventh and eighth linear bearings, respectively.

8. The robotic gripper of claim 1, wherein the first and second finger structures further comprise first and second sensor arrays, respectively, that are cooperatively configured to measure said gripping force applied by said first and second finger structures on said targeted food item.

9. An automated food production work cell configured to transfer a targeted food item such that the targeted food item is lifted from a first work surface and placed on a second work surface, the work cell comprising:
 a robotic system including a robot mechanism and a robot control circuit, the robot mechanism including an attachment member, the robot control circuit being configured to manipulate the robot mechanism such that the attachment member is moved between the first work surface and the second work surface;
a food-grade robotic gripper including: a frame that is operably connected to the attachment member of the robot mechanism, at least one guide rod that is fixedly connected to the frame, a first finger structure that is movably connected to the guide rod by a first linear bearing, and a second finger structure that is movably connected to the guide rod by a second linear bearing; and
a contact-free actuator system configured to independently drive said first and second finger structures to corresponding linear locations along the guide rod such that said first and second finger structures collectively apply a sufficient grasping force on the targeted food item to secure said targeted food item to said food-grade robotic gripper while said robot mechanism moves said food-grade robotic gripper from said first work surface to said second work surface, thereby facilitating transfer of said targeted food item from the first work surface to the second work surface,
wherein the contact-free actuator system comprises:
a first actuator unit having a first actuator housing fixedly connected to the first finger structure and including a first transducer device;
a second actuator unit having a second actuator housing fixedly connected to the second finger structure and including a second transducer device;
an elongated stator fixedly connected to the frame and including a plurality of permanent magnets aligned in parallel with the guide rod; and
a finger control circuit configured to transmit first and second finger actuation control signals to the first and second transducer devices, respectively, and
wherein said first transducer device and said second transducer device are electromagnetically coupled to the plurality of permanent magnets and independently operably configured such that, when said finger control circuit transmits a first actuator control signal to said first transducer device and simultaneously transmits a second actuator control signal to said second transducer devices, said first and second actuator units generate opposing bias forces that cause said first and second finger structures to apply said sufficient grasping force on the targeted food item.

10. The work cell of claim 9,
wherein each of said first and second actuator housings respectively include first and second cylindrical inner surfaces defining first and second central cylindrical openings, respectively, and
wherein said elongated stator comprises a stator rod that extends through said first and second central cylindrical openings such that an outer cylindrical surface of said stator rod is spaced from said first and second cylindrical inner surfaces of said stator rod.

11. The work cell of claim 9, further comprising:
a conveyor having an upward facing surface forming said first work surface, said conveyor being configured to convey said targeted food item on said first work surface in a first orthogonal direction; and
a sensing system configured to identify the targeted food item and configured to calculate trajectory data for the targeted food item,
wherein the gripper control circuit is further configured such that, when said robot mechanism positions said food-grade robotic gripper over said first work surface with said at least one guide rod aligned in a second orthogonal direction, said gripper control circuit independently drives said first and second finger structures to corresponding linear locations along the guide rod on opposite sides of said targeted food item at a first time period before said conveyor moves said targeted food item to a capture location, and to independently drive said first and second finger structures to apply said sufficient grasping force on the targeted food item at a subsequent second time period when said conveyor moves said targeted food into said capture location.

12. The work cell of claim 11,
wherein said one or more guide rods include a first guide rod and a second guide rod, said first and second finger structures being movably connected to said first guide rod, said second guide rod being fixedly connected to the frame and disposed parallel to said first guide rod and displaced from said first guide rod in said first orthogonal direction;
wherein said food-grade robotic gripper further comprises third and fourth finger structures independently movably connected to the second guide rod, and
wherein the gripper control circuit is further configured to facilitate the simultaneous transfer of multiple food items by independently driving said first and second finger structures to apply said grasping force on said targeted food item during said second time period, by independently driving said third and fourth finger structures to apply a second grasping force on a second targeted food item during a third time period, and by simultaneously driving said first, second, third and fourth finger structures to maintain said first and second grasping forces on said first and second targeted food items during a transfer process performed after the third time period.

13. The work cell of claim 12, wherein the gripper control circuit is further configured to drive said first, second, third and fourth finger structures such that said first and second targeted food items are aligned in first orthogonal direction while maintaining said first and second grasping forces on said first and second targeted food items during said transfer process.

14. The work cell of claim 9, further comprising a contact-free encoding system configured to generate first current position data indicating a current linear position of said first finger structure on said guide rod and second current position data indicating a current linear position of said second finger structure on said guide rod, wherein said gripper control circuit is further configured to generate said first and second finger actuation control signals in accordance with said first and second current position data.

15. The work cell of claim 14, wherein the contact-free encoding system comprises:
an encoder scale including an elongated base having position data disposed thereon, said elongated base being fixedly connected to the frame and including a plurality of fixed magnets arranged in series and disposed in parallel with the guide rod; and
a first encoder unit fixedly connected to the first finger structure such that an air gap is maintained between the first encoder unit and the encoder scale, wherein said first encoder unit includes a sensor that is electromagnetically coupled to the encoder scale and is operably configured to generate said first current position signal.

16. The work cell of claim 14,
wherein the first and second finger structures further comprise first and second sensor arrays, respectively, that are cooperatively configured to measure said gripping force applied by said first and second finger structures on said targeted food item, and wherein the gripper control circuit is further configured to generate said first and second finger actuation control signals in accordance with said measured gripping force.

* * * * *